United States Patent
Makhija et al.

(10) Patent No.: US 11,797,272 B2
(45) Date of Patent: Oct. 24, 2023

(54) SYSTEMS AND METHODS UTILIZING MACHINE LEARNING DRIVEN RULES ENGINE FOR DYNAMIC DATA-DRIVEN ENTERPRISE APPLICATION

(71) Applicant: NB Ventures, Inc., Clark, NJ (US)

(72) Inventors: Subhash Makhija, Westfield, NJ (US); Saratendu Sethi, Apex, NC (US); Huzaifa Matawala, Princeton, NJ (US); Manish Sharma, South Plainfield, NJ (US); Shivendra Singh Malik, Vasco-da-Gama (IN); Srishti Kush, Jersey City, NJ (US)

(73) Assignee: NB Ventures, Inc., Clark, NJ (US)

( * ) Notice: Subject to any disclaimer, the term of this patent is extended or adjusted under 35 U.S.C. 154(b) by 175 days.

(21) Appl. No.: 17/565,833

(22) Filed: Dec. 30, 2021

(65) Prior Publication Data
US 2023/0214193 A1 Jul. 6, 2023

(51) Int. Cl.
*G06F 8/34* (2018.01)
*G06N 5/025* (2023.01)
*G06V 30/19* (2022.01)

(52) U.S. Cl.
CPC .............. *G06F 8/34* (2013.01); *G06N 5/025* (2013.01); *G06V 30/19113* (2022.01)

(58) Field of Classification Search
CPC ...... G06F 8/34; G06V 30/19113; G06N 5/025
See application file for complete search history.

(56) References Cited

U.S. PATENT DOCUMENTS

| 2021/0132962 A1* | 5/2021 | Makhija | G06F 9/454 |
| 2022/0035688 A1* | 2/2022 | Walsh | G06Q 40/04 |
| 2022/0036437 A1* | 2/2022 | Morton | G06F 16/214 |
| 2023/0131682 A1* | 4/2023 | Singh | G06V 30/41 |
| | | | 382/100 |

* cited by examiner

*Primary Examiner* — Ziaul A Chowdhury
(74) *Attorney, Agent, or Firm* — BrownWinick Law Firm; David M. Breiner

(57) ABSTRACT

The present invention generally relates to system, method and graphical user interface for executing one or more tasks in dynamic data driven enterprise application. The invention includes creation of rules on a rule creation interface by one or more syntax from a rule creation syntax data library. The system of the invention is configured to identify optimum rule to process one or more tasks. The invention provides machine learning models driven rule engine for executing the tasks wherein an AI engine invokes dynamic conditions of the rules to execute the task.

20 Claims, 18 Drawing Sheets

SYSTEMS AND METHODS UTILIZING MACHINE LEARNING DRIVEN RULES ENGINE FOR DYNAMIC DATA-DRIVEN ENTERPRISE APPLICATION

BACKGROUND

1. Technical Field

The present invention relates generally to rules engine in enterprise applications. More particularly, the invention relates to systems, methods and computer program product for machine learning driven rules engine for dynamic data-driven enterprise application.

2. Description of the Prior Art

Enterprise applications support organization in executing multiple operations depending on the domain like insurance, retail, supply chain etc. Depending on the complexity of the operations or tasks to be executed and ever-changing needs, each organization requires faster processing and automation of functions through certain pre-configured rules. Most rules are logic based that utilize static conditions and express operational specific constraints. For e.g.; in supply chain domain a rule may include conditional logic to approve an invoice transaction based on an upper limit set by the rule. However, in enterprise application such as supply chain management applications, the static conditions are unable to capture complex scenarios such as dynamically computed risk-based conditions, complex contract management, inventory management, or related supply chain scenarios.

The complexity of supply chain domain may require infinite number of rules to process each operation or task which makes it cumbersome and almost impossible to determine the type of rule to be processed for executing the operation or task. Further, in real time data processing environment, the rules need to be configured to process updated datasets for executing tasks. In case additional attributes needs to be processed, the rules become obsolete and are unable to execute the operation. Moreover, in real time processing scenarios, the rules are not integrated to the backend data processing in the enterprise application, thereby not allowing structuring of machine learning based processing decisions.

Further, in case of a decentralized system, the enterprise application operations present multiple challenges like security vulnerabilities, privacy leakage, complicated authorization and workflow inefficiencies etc. Further, blockchain implemented systems present other unique challenges. Data processing in complex supply chain management systems with blockchain built sub-systems, present substantive technical challenges including model identification for processing datasets related to blockchain transactions and contracts. Such, systems require frequent access to and interaction with blockchain network, which is not only costly but also resource consuming. Executing any operation by creating rules, say, for processing invoice in a blockchain implemented system is extremely complex requiring processing of data at multiple data layers. Further, the blockchain implemented systems require specific security structure to enable secured access while executing any task.

In view of the above problems, there is a need for system and method for executing one or more tasks in an enterprise application that can overcome the problems associated with the prior arts.

SUMMARY

According to an embodiment, the present invention provides a system, method and graphical user interface for executing one or more tasks in a dynamic data driven enterprise application. The method includes generating a GUI, wherein the GUI includes a first input component for receiving a first input indicating the one or more tasks to be executed through the GUI, receiving the first input indicating the one or more tasks to be executed via the first input component, wherein an AI engine coupled to the processing device identifies a plurality of rules configured for executing the one or more tasks, in response to identification of a plurality of rules configured to execute the one or more tasks, generating and rendering within the GUI a list of optimum rules from the plurality of rules, receiving a second input indicating at least one rule from the list of optimum rules for executing the one or more tasks via a second input component, wherein the at least one rule represents a set of syntax structured to execute the one or more tasks wherein the set of syntax is previously generated by analyzing historical data related to the one or more tasks through the AI engine, and triggering one or more machine learning models based on the second input to obtain a second output from the one or more machine learning models to be rendered within the GUI indicating execution of the one or more task wherein the one or more machine learning models is integrated into a rule engine coupled to the processor for processing the at least one rule to execute the one or more tasks.

In an embodiment, the present invention provides a system and method for generating a graphical user interface (GUI) for rule creation and one or more task execution in enterprise application. The system includes a processing device and a memory device including instructions that are executable by the processing device for causing the processing device to generate the GUI, wherein the GUI includes a first input component for receiving an input indicating one or more data attributes of the one or more task to be executed through the GUI. The method includes processing the first input by an AI engine to determine existence of a rule in a historical rule database for processing the task and rendering the first output on the GUI. The method includes the step of generating a rule creation interface on the GUI if the first output indicates absence of any rule to process the task. The method includes the step of receiving a second input in response to the first output through a second input component on the GUI for creating at least one rule to execute the one or more tasks wherein the at least one rule represents a set of syntax structured on the GUI to execute the one or more tasks. The method includes the step of identifying and triggering one or more machine learning models based on the second input to obtain a second output from the one or more machine learning models to be rendered within the GUI indicating execution of the one or more task wherein the one or more machine learning models is integrated into a rule engine coupled to the processor for processing the at least one rule to execute the one or more tasks.

In an embodiment, the method for executing one or more tasks in an enterprise application includes receiving at least one rule on a rule creation interface by a user to execute one or more tasks wherein a rule creation syntax data library is provided on the interface for enabling the user to create the at least one rule; and identifying and triggering one or more machine learning (ML) models related to the at least one rule for processing the at least one rule to execute the one or more task, wherein the one or more machine learning models is integrated into a rule engine coupled to the processor for processing the at least one rule to execute the one or more tasks.

In an embodiment, the system and method of the present invention includes one or more data scripts configured for generating the list of optimum rules based on a rule evaluation, wherein the one or more data scripts are backend scripts created by a bot based on the first input and AI processing for enabling automation of identifying and generating the optimum rules from the plurality of rules.

In an embodiment, the present invention provides a non-transitory computer-readable storage medium coupled to one or more processors and having instructions stored thereon which, when executed by the one or more processors, cause the one or more processors to perform a method for executing one or more tasks in an enterprise application.

In an embodiment, the one or more Machine learning (ML) models include classification model, regression model, recommendation model and clustering/anomaly detection model. Further, the one or more machine learning models create a standardized integration with each type of the one or more machine learning models in the rule engine.

In an advantageous aspect, the system and method of the present invention enables rule creation for processing of one or more enterprise application task through a graphical user interface configured to provide a syntax data library with a plurality of components that enable creation of one or more rules driven by one or more machine learning models. Further, the system and method of the invention is configured to evaluate a plurality of rules that execute one or more tasks in an enterprise application. The rule evaluation enables the system to identify at least one optimum rule for processing the task to be executed. The invention utilized Artificial intelligence for rule evaluation through data scripts.

In yet another embodiment, the system includes a blockchain network having one or more data blocks connected to each other and configured for storing SCM application data. The system creates rule for integrating the AI engine with one or more external entity systems through the blockchain network, wherein any transaction through the blockchain network is encrypted using a random number and the one or more tasks in the one or more SCM application functions is executed through the blockchain network.

In an advantageous aspect, the present invention utilizes Machine Learning algorithms, rule engine, artificial intelligence engine, prediction data models, and data analysis for rule generation to execute of one or more tasks in the enterprise application.

BRIEF DESCRIPTION OF THE DRAWINGS

The disclosure will be better understood and when consideration is given to the drawings and the detailed description which follows. Such description makes reference to the annexed drawings wherein:

FIG. 3 is a user interface for rule creation in accordance with an embodiment of the invention.

FIG. 4 is a user interface showing a list of rules including system configured rules, rules created on a rule creation user interface and rules created by extension tools in accordance with an embodiment of the invention.

FIG. 4A is a user interface showing a list of rules with versions in accordance with an embodiment of the invention.

FIG. 5E is a rule creation interface creating a set of test cases to run values and find the outcome from the rule to ensure that Rule is working and delivering results in accordance with an embodiment of the invention.

DETAILED DESCRIPTION

Figure 1:
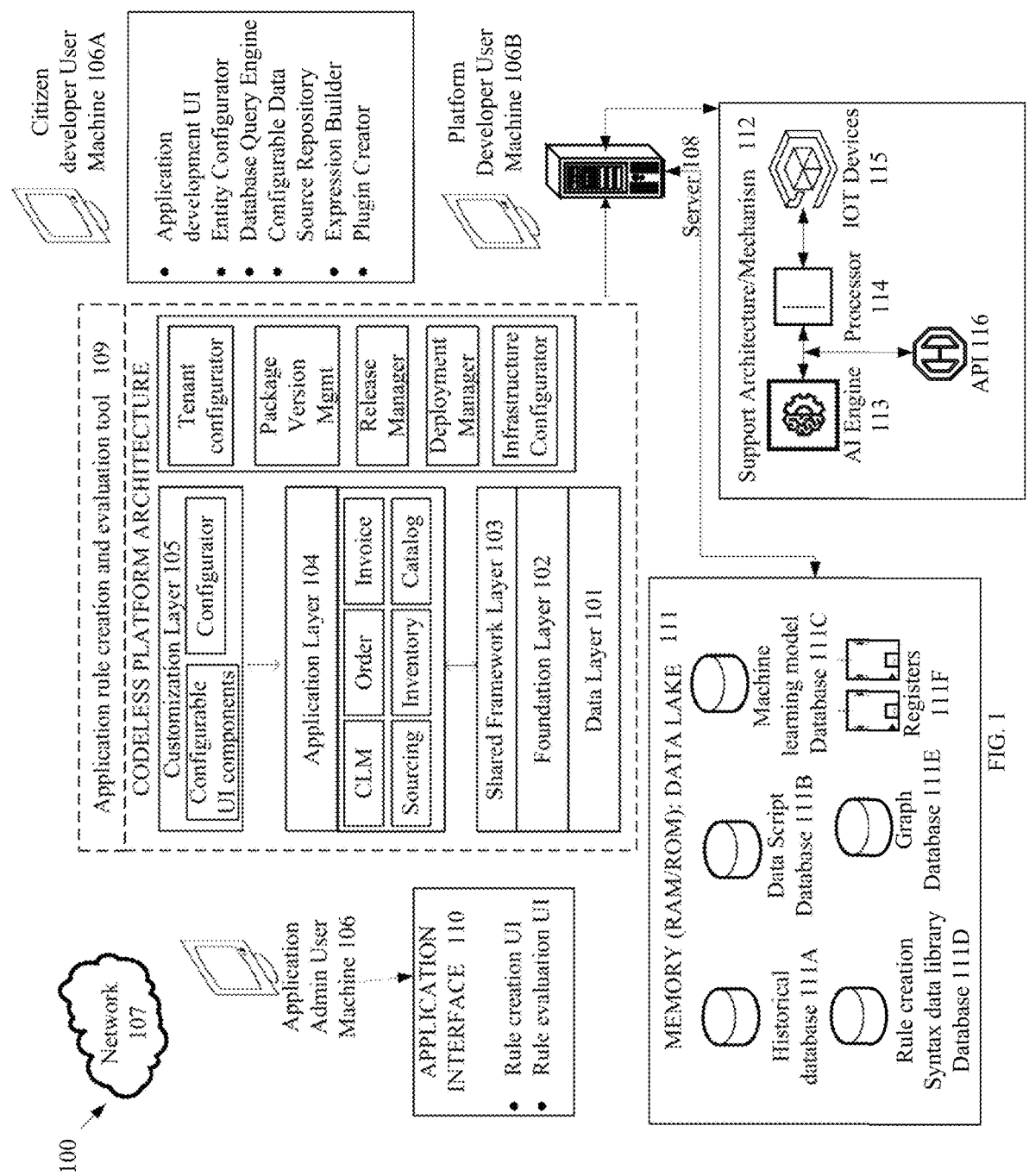
FIG. 1 is a view of a system for executing one or more tasks in an enterprise application in accordance with an embodiment of the invention.

Described herein are the various embodiments of the present invention, which includes method and system for executing one or more tasks in a dynamic data driven enterprise application including a supply chain management application.

The various embodiments including the example embodiments will now be described more fully with reference to the accompanying drawings, in which the various embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on," "connected to," or "coupled to"

another element or layer, it can be directly on, connected to, or coupled to the other element or layer or intervening elements or layers that may be present. As used herein, the term "and/or" includes any and all combinations of one or more of the associated listed items.

Spatially relative terms, such as "rule creation," "syntax data library," or "optimum rules," and the like, may be used herein for ease of description to describe one element or feature's relationship to another element(s) or feature(s) as illustrated in the figures. It will be understood that the spatially relative terms are intended to encompass different orientations of the structure in use or operation in addition to the orientation depicted in the figures.

The subject matter of various embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, the various embodiments including the example embodiments relate to a system and method for executing one or more tasks in a dynamic data driven enterprise application.

In an exemplary embodiment, the present invention provides a machine learning driven rules engine for dynamic data driven enterprise application to execute one or more tasks including supply chain management tasks. The invention provides a graphical user interface (GUI) with one or more graphical elements structured on the interface to enable a user to execute one or more rule creation, rule finder, rule conflict or rule execution tasks. The GUI receives an input through an input component of the graphical element, the input indicates a task to be executed. The input and associated data attributes of the task are processed by an AI engine to determine intent of the task for triggering a plurality of rules stored in a historical rules database to identify an optimum rule for executing the task. In absence of a rule, the GUI enables a user to create rule based on a rule creation syntax data library provided on the rule creation interface to execute the task through rule creation interface of the GUI. The rule is processed by one or more machine learning models related to the rule for executing the task. The machine learning models are integrated into the rule engine. The rule engine process one or more tasks in an enterprise application developed through a codeless platform. While rules engines are used to execute discrete logic that needs precision, machine learning, is focused on taking a number of inputs and trying to predict an outcome.

In an embodiment, the rule includes system configured rules created by an enterprise application codeless platform, rules created by extension tools, and rules created on the rules creation interface of the GUI.

Referring to FIG. 1, a system 100 for executing one or more tasks in an enterprise application is provided in accordance with an embodiment of the invention. The system 100 is implemented over a layered codeless platform architecture having a data layer 101, a foundation layer 102, a shared framework layer 103, an application layer 104, and a customization layer 105. Each layer of the architecture includes a plurality of configurable components interacting with each other to execute at least one operation of the SCM enterprise application. It shall be apparent to a person skilled in the art that while FIG. 1 provides certain configurable components, the nature of the components itself enables redesigning of the platform architecture through addition, deletion, modification of the configurable components and their positioning in the layered architecture. Such addition, modification of configurable components depending on the nature of the architecture layer function shall be within the scope of this invention.

The system 100 also includes one or more entity machines including an application admin user machine 106, a citizen developer user machine 106A and a platform developer user machine 106B. The system 100 includes a network 107 configured for communicating with one or more elements of the system for execution of one or more tasks in enterprise applications. The system 100 includes a server 108 configured for receiving data and instructions from the entity machines (106, 106A, 106B). The system 100 includes application rule creation and evaluation tool 109 having a plurality of support architecture components for performing various prediction and analysis through AI engine with multiple functions including processing of historical rules, Artificial intelligence (AI) based processing of application datasets, creation of one or more rules and data models configured to process different parameters etc.

In an embodiment the entity machines (106, 106A, 106B) may communicate with the server 108 wirelessly through communication interface, which may include digital signal processing circuitry. Also, the entity machines (106, 106A, 106B) may be implemented in a number of different forms, for example, as a smartphone, computer, personal digital assistant, or other similar devices.

The computing devices referred to as the entity machine, server, processor etc. of the present invention are intended to represent various forms of digital computers, such as laptops, desktops, workstations, personal digital assistants, and other appropriate computers. Computing device of the present invention further intend to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this disclosure.

In an embodiment, the system is provided in a cloud or cloud-based computing environment. The underlying codeless development architecture of the system enables more secured processes.

In an embodiment the server 108 of the invention may include various sub-servers for communicating and processing data across the network. The sub-servers include but are not limited to content management server, application server, directory server, database server, mobile information server and real-time communication server.

In example embodiment the server 108 shall include electronic circuitry for enabling execution of various steps by one or more processors. The electronic circuity has various elements including but not limited to a plurality of arithmetic logic units (ALU) and floating-point Units (FPU's). The ALU enables processing of binary integers to assist in formation of at least one table of rule syntax where, the domain models implemented for domain characteristic prediction are applied to the data table for obtaining rules for executing one or more tasks in dynamic data driven enterprise application. In an example embodiment the server electronic circuitry includes at least one Athematic logic unit (ALU), floating point units (FPU), other processors, memory, storage devices, high-speed interfaces connected through buses for connecting to memory and high-speed expansion ports, and a low-speed interface connecting to low-speed bus and storage device. Each of the components of the electronic circuitry, are interconnected using various busses, and may be mounted on a common motherboard or in other manners as appropriate. The processor can process instructions for execution within the server 108, including instructions stored in the memory or on the storage devices to display graphical information for the graphical user interface (GUI) on an external input/output device, such as display coupled to high-speed interface. In other implementations, multiple processors and/or multiple busses may be used, as appropriate, along with multiple memories and types of memory. Also, multiple servers may be connected, with each server providing portions of the necessary operations (e.g., as a server bank, a group of blade servers, or a multi-processor system).

In an example embodiment, the system of the present invention includes a front-end web server communicatively coupled to at least one database server, where the front-end web server is configured to process input received through the rule creation interface or extension tool interface by the one or more processors based on one or more domain models and applying an AI based dynamic processing logic to automate rule creation and task execution actions through the GUI.

In a related embodiment, the extension tool is a programming tool configured as per the application domain for enabling an application user/admin user to create rules for processing one or more tasks in an enterprise application. The extension tool may be any editor that is extended with plugins as per domain requirement. It provides an integrated development environment with GUI for enabling domain specific structuring of applications. The extension tool is configured for creating one or more domain specific syntax data library to create rule for executing one or more SCM application task.

The application user or application admin user interface 106 of the system 100 includes an application interface 110 having rule creation UI and rule evaluation UI for executing the one or more tasks in the enterprise application.

The citizen developer user interface 106A of the system 100 includes a codeless development application UI, entity configurator, data base query engine, configurable data source repository, expression builder and plugin creator.

In an embodiment, the system 100 includes a memory data store/data lake 111 configured for storing data related to enterprise application, rule creation UI for creating at least one rule to execute one or more tasks in an enterprise application etc. Further, the system 100 includes a support architecture 112 configured for enabling interacting of application rule creation and evaluation tool 109, memory data store 111, entity machines (106, 106A, 106B) and server 108. The support architecture 112 includes an AI engine 113 coupled to one or more processors 114 configured for processing one or more SCM application tasks. The support architecture 112 also includes a plurality of IOT devices 115 configured to capturing, transmitting, receiving data and instructions from one or more computing devices. The plurality of IOT devices 115 is configured to provide the inputs to the server 108 on initiation of the SCM action wherein the IOT devices include sensor, mobile, camera, Bluetooth, RF tags and similar devices or combination thereof. Further, the inputs may include but is not limited to inventory management data or warehouse management data or data related to one or more SCM application operation etc.

In an embodiment, the present invention uses GPUs (Graphical processing units) for enabling AI engine 113 to provide computing power to processes humongous amount of data.

In an exemplary embodiment, the AI engine 113 employs machine learning techniques that learn patterns and generate insights from the data for enabling automation of operations. Further, the AI engine 113 with ML employs deep learning that utilizes artificial neural networks to mimic neural network. The artificial neural networks analyze data to determine associations and provide meaning to unidentified or new dataset.

The support architecture 112 also includes a plurality of API (application programming interface) 116 configured for plugging aspects of AI (Artificial Intelligence) into datasets for identifying rules to execute the tasks including PO creation, invoice, inventory management or any other supply chain management task. Further, the API is also consumed by the bots and mobile applications.

In an exemplary embodiment, the support mechanism 112 includes a plurality of data processing bots configured to automate rule creation, rule evaluation, data extraction, data analysis etc., for execution of SCM related processing tasks. The support mechanism 112 may include hardware components or software components or a combination of hardware and software components integrating multiple datasets through one or more applications implemented on a cloud integration platform.

In an embodiment, the software component as a bot may be a computer program enabling an application to integrate with distinct data source devices and systems by utilizing Artificial intelligence. The hardware includes the memory, the processor, control unit and other associated chipsets especially dedicated for performing recalibration of data models to carry out rule creation, rule valuation, data extraction, classification, and one or more task execution in the EA when triggered by the bots. The memory may include instruction that are executable by the processor for causing the processor to execute the method of executing one or more tasks in the EA.

The one or more processors 114 may be implemented as a chipset of chips that include separate and multiple analog and digital processors. The processor may provide coordination of the other components, such as controlling user interfaces, applications run by devices, and wireless communication by devices. The Processor may communicate with a user through control interface and display interface coupled to a display. The display may be, for example, a TFT LCD (Thin-Film-Transistor Liquid Crystal Display) or an OLED (Organic Light Emitting Diode) display, or other appropriate display technology. The display interface may comprise appropriate circuitry for driving the display to present graphical and other information to an entity/user. The control interface may receive commands from a user and convert them for submission to the processor. In addition, an external interface may be provided in communication with processor, so as to enable near area communication of device with other devices. External interface may provide, for example, for wired communication in some implementations, or for wireless communication in other implementations, and multiple interfaces may also be used.

In an embodiment, the underlying codeless platform architecture of the present invention enables one or more components of tool 109 to invoke changes in the configurable components of the codeless platform for creating rules. The configurable components enable an application developer user/a citizen developer user, a platform developer user and a SCM application user working with the SCM application to execute the operations based on the rules created through the interface. The SCM application user or admin user triggers and interacts with the customization layer 105 for execution of one or more tasks through application user machine 106, a function developer user or citizen developer user triggers and interacts with the application layer 104 to create rules for execution of the operation through citizen developer machine 106A, and a platform developer user through its computing device 106B triggers the shared framework layer 103, the foundation layer 102 and the data layer 101 to structure the platform for enabling codeless development of SCM applications thereby providing underlying architecture for restricting of one or more applications.

In an embodiment, the codeless platform of the system 100 includes components such as tenant configurator, package version management, release manager, deployment manager and infrastructure configurator as part of package management. These components provide window for citizen developer and platform developer to release the packages and provide visibility of the deployment pipeline. The tenant configurator enables deployment of packages to one or more clients across environments. It provides ability to create and manage details of customers through UI. It gives deployment experience through projects and environments to support the tenant concept. The Version management component manages multiple versions of the packages and changes made by application developers and platform developers. The component provides UI to look at multiple versions of the package and compare versions. It manages minor and major versions. The release manager component is responsible for managing, planning, scheduling, and controlling delivery throughout the release lifecycle using other sub-components and for Orchestrating entire pipeline with automation. The deployment manager component configures and run delivery workflows for applications and platforms. It Creates standardized deployment process to deploy predictable, high-quality releases. The component automates workflows, including versioning, application package generation, artifact management, and package promotion to different stages in the workflow. The infrastructure configurator component is responsible to provision services and database repositories as per application and loads. The component supports automation to provision infrastructure as per release and version.

In an exemplary embodiment, apart from application user interface, output of the system is exposed as API for third party digital platforms and applications. Since, the API is also consumed by bots and mobile applications, it enables connection with blockchain networks through machine learning fragments.

In an example embodiment, the system 100 of the present invention includes a memory data store 111 having a plurality of databases as shown in FIG. 1. The data store 111 includes a historical database 111A for storing historical data including but not limited to historical SCM application data, historical rules data, historical data with identifier information and relationship information defining a relationship of one or more data attributes of a task with one or more historical rules, historical documents data with plurality of data items etc. The historical database 111A also includes classified historical data related to one or more document, file or function executed through the enterprise application. The one or more processors of the system are configured for performing one or more SCM processing task associated one or more data scripts configured for generating the list of optimum rules based on a rule evaluation, wherein the one or more data scripts are stored in a data script database 111B and the data scripts are backend scripts created by a bot based on the first input and AI processing for enabling automation of identifying and generating the optimum rules from the plurality of rules.

In an embodiment, the system 100 of the present invention provides the historical database configured for storing historical data where the connections of the data in the database are structured on AI based model-driven flows incorporating reference to one or more identifiers to link the data and rules within supply chain.

The data store 111 includes a machine learning model database 111C having one or more domain models including but not limited to conceptual or particular domain data models. The machine learning model includes classification model, regression models, clustering model and recommendation model. The data store 111 also includes a plurality of SCM related data models that enable processing of data in enterprise application. The data models include graph data models trained on graph structures for semantic queries with nodes, edges and properties to represent and store data. The data models also include a plurality of training models required to process the received input data for identifying relationship with historical data stored in the historical database 111A. The data model also includes relational data model, document data model as relationship models for identification of relationships. The data store 111 also includes a rule creation syntax data library database 111D having a plurality of domain specific rule creation syntax configured to create rule for processing one or more tasks in EA.

In an exemplary embodiment, the system for executing one or more tasks also include blockchain based implementations. The system enables rule engine to extend federated machine learning models to blockchain implemented databases. The systems including third party systems implemented through blockchain network enables processing of the federated machine learning model where, the federated machine learning model is configured to combine/federate output of one or more distinct machine learning models. The rule creation interface may structure rules with identifier or security verification process before involving any changes or executing the task. The identifier or verification may be through internet protocol (IP) address, security certificate data etc., and the logical flow block with blockchain implementation includes public key, primary key, to ensure secured communication through a blockchain network for executing the SCM application tasks. Further, the blockchain implemented system enables connection of one or more client nodes with one or more server nodes through the blockchain network. The blockchain network includes one or more data blocks connected to each other and configured for storing SCM application data. The blockchain network enables an integrator to integrate the AI engine with one or more external entity systems.

The data store 111 also includes a graph database 111E configured to store nodes and relationships. The graph database 111E is a specialized, single-purpose platform for creating and manipulating graphs. Graphs contain nodes, edges, and properties, all of which are used to represent and store data.

The data store 111 also includes a plurality of registers 111F as part of the memory data store 111 for temporarily storing data from various databases to enable transfer of data by the processors 114 between the databases as per the instructions of the AI engine 113 to enable processing of received input data for creation of rules to execute on or more tasks.

The memory data store 111 may be a volatile, a non-volatile memory or memory may also be another form of computer-readable medium, such as a magnetic or optical disk.

The memory store 111 may also include storage device capable of providing mass storage. In one implementation, the storage device may be or contain a computer-readable medium, such as a floppy disk device, a hard disk device, an optical disk device, or a tape device, a flash memory or other similar solid-state memory device, or an array of devices, including devices in a storage area network or other configurations.

Figure 1A:
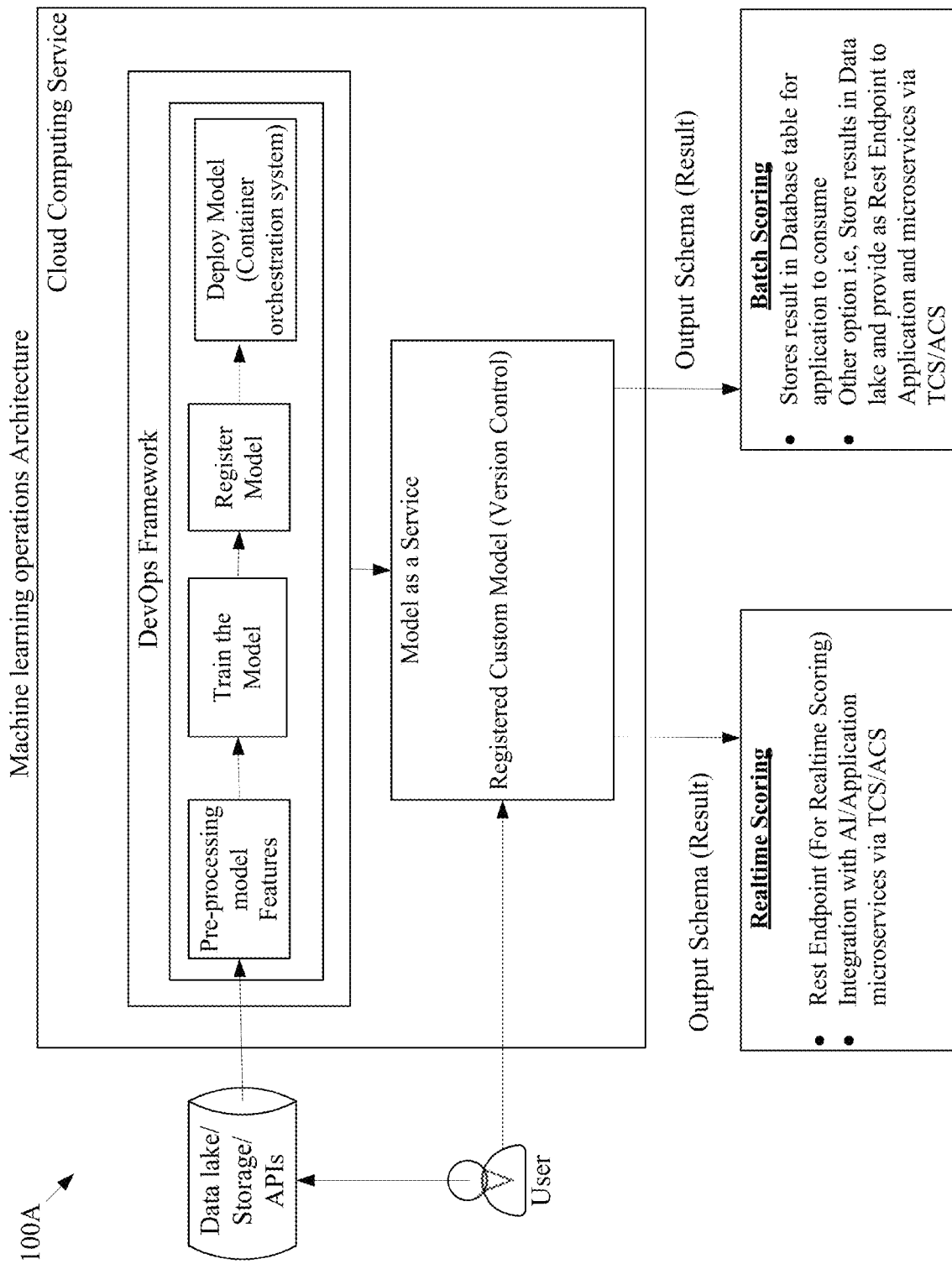
FIG. 1A is a view of a machine learning operation framework of model driven rule engine for dynamic data driven enterprise application in accordance with an example embodiment of the invention.

Referring to FIG. 1A, a machine learning operation framework 100A of model driven rule engine for dynamic data driven enterprise application is provided in accordance with an example embodiment of the invention. The machine learning model is standardized in codeless platform which can be accessed by rules engine. The machine learning models are trained through workflows. Once the model is built, the machine learning operations architecture 100A demonstrates how the model is generically exposed to the codeless platform through a 'model-as-service' interface. The machine learning (ML) operations workflow is designed in a cloud-agnostic fashion and can be deployed anywhere. Since the ML models are trained and deployed as 'model-as-service' which makes them accessible as REST microservices to rest of the codeless platform. The REST microservices follow the same authentication/authorization (aka ACS/TCS) making the ML model available under the same microservices. The model management is critical, and the ML model is 'registered', i.e. ML model is versioned and the higher-level application (viz. rules engine) can revert or different rules can refer to different versions of the same ML model. Further the machine learning operations framework ensure to automatically trigger, retraining of the ML model, hence rules referring to ML benefit from latest insights from the data.

The framework 100A enables defining of input and output schema for applying on a registered model of the framework. Further, the framework enables integration with microservices, integrate with multi-cloud, implementation of model-as-service as part of shared service layer, and wrapper custom model for specific machine learning models etc. The machine learning operations enable model version control, end to end lineage tracking (with logs and Dashboard), for near real-time scoring, output response is provided as REST endpoint. For batch scoring, output response is saved in database/datastore table and then used as REST endpoint.

Figure 1B:
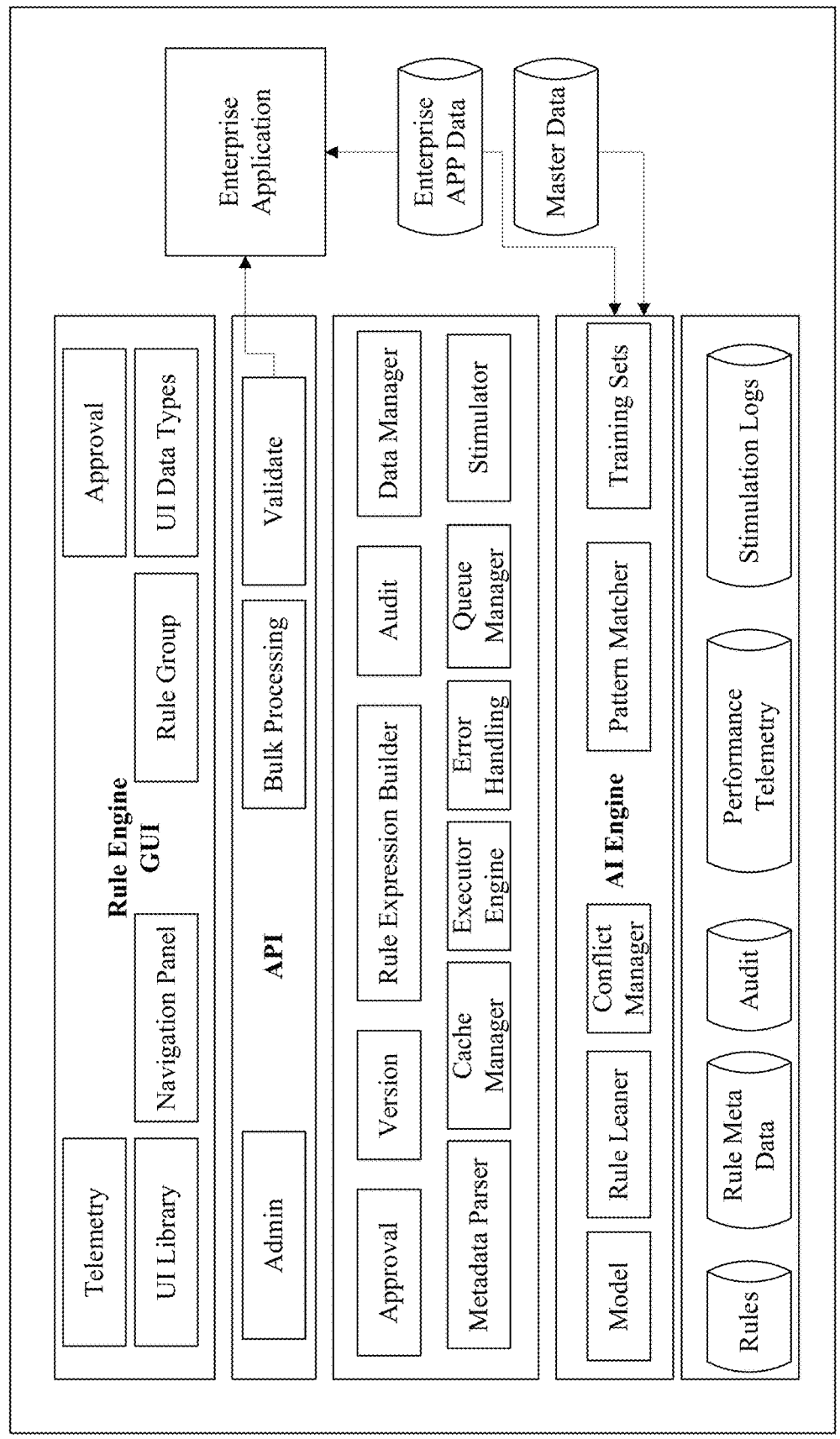
FIG. 1B is a rule engine block diagram of the system in accordance with an embodiment of the invention.

Referring to FIG. 1B is a rule engine block diagram 100B of the system is provided in accordance with an embodiment of the invention. The primary layer of rule engine includes a plurality of components such as execution engine, metadata parser, error handling, audit, stimulation engine, data manager, cache manager, approval, versions. The execution engine is configured to execute the rules after Rule Metadata is parsed by Parser component. The Metadata Parser is responsible to convert JSON data received from Enterprise application and metadata, connecting to dependent master data APIs, Converts into format as per Execution Engine. The Error Handling component manages Error Handling and capture logs along with showing information to User. The Audit component captures all transactions received for Rules. Data is used by stimulation engine that provides ability for Admin to mock rules output after any changes, reduces organization errors. It also connects with AI engine for Conflict resolution, Duplicates etc. The data manager is responsible to manage Save and GET and connecting to underlying database repository. The Cache Manager is configured to manage Caching of frequent master data API, Rule configurations and settings. It also reduces unnecessary database calls and increases performance. The approval component is configured to enable approval of rules before publishing to applications. The Versions component allows versioning of rules after every change.

In a related embodiment, the rule engine provides ability to GUI for managing rules, approval for rules and listing of rules. The GUI has various tool and criterion sets, groups, and also connects to API for transactions. The GUI also provides navigation panel with list of rule tool sets. The API block for rule engine GUI manages rules, versions and approvals. The API also invokes rule engine, accept enterprise data like Purchase order (PO), contract etc. The API enable rule evaluation and real time response. The AI engine include various components related to data processing in the system. The AI engine enables creation of domain models, data models and training data sets based on the data models for processing data in enterprise applications.

Figure 2:
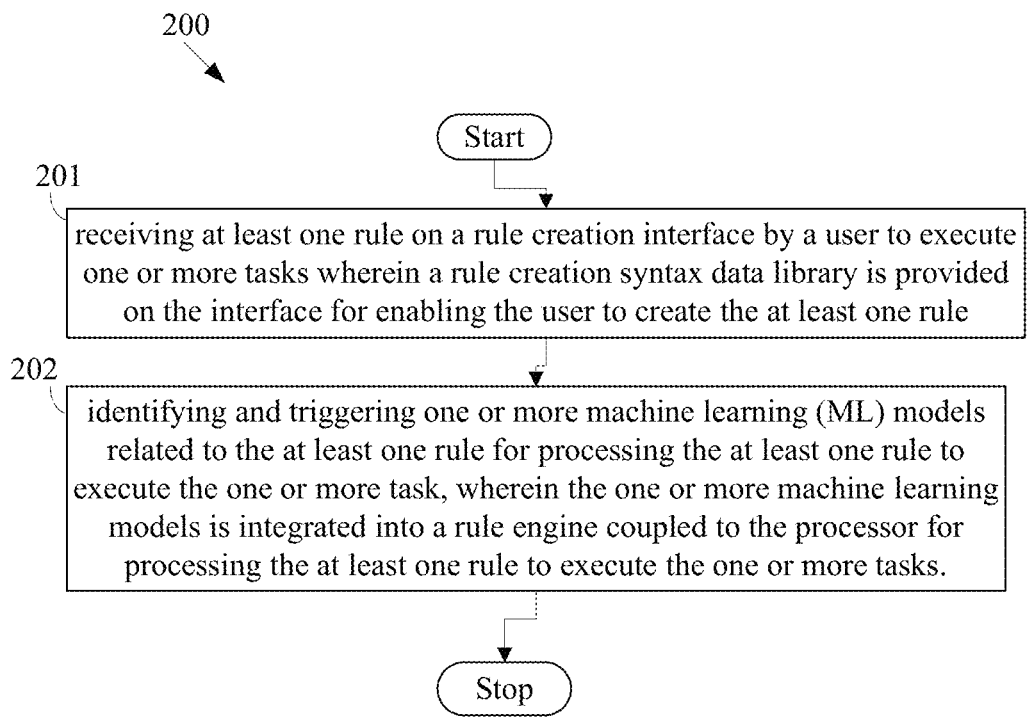
FIG. 2 is a flowchart depicting a method for executing one or more tasks in an enterprise application in accordance with an embodiment of the invention.

Referring to FIG. 2, a flowchart 200 depicting a method for executing one or more tasks in an enterprise application is provided in accordance with an embodiment of the invention. The method includes the step of 201 receiving at least one rule on a rule creation interface by a user to execute one or more tasks wherein a rule creation syntax data library is provided on the interface for enabling the user to create the at least one rule. In step 202, identifying and triggering one or more machine learning (ML) models related to the at least one rule for processing the at least one rule to execute the one or more tasks, wherein the one or more machine learning models is integrated into a rules engine coupled to a processor for processing the at least one rule to execute the one or more tasks.

In an embodiment, the one or more machine learning models include classification model, regression model, recommendation model and clustering/anomaly detection model. The classification model produces a "label" on the object being processed, e.g. a) produce sentiment on a news article: 'positive' or 'negative', b) Classify clause in a contract: 'data privacy', 'assignment', etc.; c) Classify a spend transaction: 'IT spend', 'office supply', 'lab material', etc. This a supervised ML model, i.e. requires training data. The output of this model 'label' can be multi-valued, i.e. an object can be assigned to multiple categories.

In an embodiment, the regression model predicts a 'numerical value', e.g. a) predict the risk in a range [0, 1] supplier's ability to meet timelines; b) predict the optimal price on an item; c) Forecast the monthly demand for next 6 months etc. This is a supervised ML model. The 'numerical value' can be bounded like the risk score, probability in the range of [0, 1] or Unbounded like prices or Indexed values, e.g. 6 different forecast values for next 6-months.

In an embodiment, the recommendation model recommends the next state/action/combination, e.g. a) Next state: Process routing of invoices based on item, payment amount, supplier, etc.; b) Action: Directly send invoice for executive approval; c) Combination: "you may also like to see . . . " items in a retail website; d) Offers: Recommend a discount in retail shopping cart based on user profile and actions. This is a supervised ML model (training data is provided) or semi-supervised (the model is being updated through user selections/actions). The output of this ML-model is interpretable according to the organization domain.

In an embodiment, the clustering/Anomaly detection model clusters a set of data points to understand the primary themes in the data and identify outliers/anomalies that don't fit into any clusters/themes, e.g. a) Cluster items that are typically ordered together in the same invoice and identify fraud when a seemingly unrelated item appears; b) (Cybersecurity example): Cluster the department's login IP addresses and identify any unusual login pattern from a different department. This is unsupervised ML model (i.e. no prior training data required) and it produces two types of outputs (i) a set of clusters and the membership of transactions/items for those clusters and (ii) a set of items/transaction that don't fit into any clusters.

In an embodiment, the one or more machine learning models create a standardized integration with each type of the one or more machine learning models in the rules engine.

In an embodiment, the one or more machine learning models are trained and deployed as model-as-service thereby enabling access to the models as microservice of a codeless platform.

In an embodiment, the invention includes creating a training data model by retrieving the historical data elements from database, cleansing the historical data elements for obtaining normalized historical data, extracting a plurality of categories from the normalized historical data for creating taxonomy of relationships associated with the one or more data attributes, fetching a plurality of code vectors from the normalized historical data wherein the code vectors correspond to each of the extracted categories of the relationships associated with the one or more data attributes, extracting a plurality of distinct words from the normalized historical data to create a list of variables, transforming normalized historical data into a training data matrix using the list of variables, and creating the training relationship data model from the classification code vectors and the training data matrix by using the machine learning engine (MLE) and the AI engine.

In a related embodiment, the relationship between the task to be executed and the rule configured to execute the task is identified based on relationship between one or more data attribute of the task and the one or more historical data elements. The determination of the relationship is dependent on one or more trained data model for processing the received task.

In an example embodiment, the invention includes applying relational data model (RDM) algorithms to train one or more relational data model for the normalized historical data by using machine learning engine (MLE), applying document model (DM) algorithms to obtain document data models by using machine learning engine (MLE), applying graphical data model (GDM) algorithms to obtain graphical data models by using machine learning engine (MLE), and saving RDM, DM and GDM models as the training relationship models for identification of relationships in a training model database.

In an exemplary embodiment, the system of the invention is responsible to generate operational process workflow like business process through AI using model driven pattern. The models are generated using historical workflow. Modeling decision of existing business process are driven through machine learning (ML) models. The ML makes predictions based on the historical workflow data as predictions brings knowledge of operational/business process and interpretation and the predictions are non-deterministic.

Further, data driven model relies on larger volume of data. The data driven AI pattern is driven by historical knowledge data while deterministic are driven through expert and deep learner's engine focused on specific problem areas. The data driven AI patterns relies on smaller data sets which are accurate as they are focused on procurement and supply chain workflows and targeted for various industry verticals.

In a related embodiment, the model-driven AI flow enables users to access data in a unified manner regardless of the underlying data store. Data store queries (e.g., relational, or file systems) are significantly streamlined for structuring the workflow. The essential aspects of time and space, data normalizing, versioning, and tracking are all handled by the system.

In an embodiment, the rule creation interface is a graphical user interface (GUI) having one or more graphical elements configured to receive one or more inputs for structuring the rule wherein the GUI includes a UI Expression builder configured for processing complex functions, Boolean operations, and logical operators.

In an embodiment, the method of executing one or more tasks in the dynamic data driven enterprise application includes generating the GUI, wherein the GUI includes an input component for receiving an input indicating the at least one ride to execute the one or more tasks through the GUI. The method further includes receiving the input indicating the at least one rule via the input component, wherein the at least one rule represents a set of syntax structured to execute the one or more tasks, identifying and triggering the one or more machine learning models based on the input for obtaining an output to be rendered within the GUI indicating execution of the one or more tasks.

In an embodiment, the set of syntax is previously generated by analyzing historical data related to the one or more tasks through the AI engine.

In an embodiment the invention includes checking by an AI engine, if the at least one rule is existing in a historical rules database and triggering a. notification on the GUI informing existence of a duplicate rule wherein one or more data attributes associated with the one or more tasks to be executed is analyzed by the AI engine for determining existence of duplicate rules.

The rule creation syntax data library includes one or more components related to a plurality enterprise application function, wherein the components include condition, group, array, properties, criteria, logical operators, functional or operational components.

In an embodiment, the rules engine is configured for using the one or more machine learning models, wherein the rules engine is configured for directing to one or more machine learning models as service end point, creating a data mapping of machine learning model to a schema of data that a machine learning service requires, and providing mapping of output of the machine learning service.

In an embodiment, the one or more tasks include demand planning, supply planning, inventory management, warehouse management, contract lifecycle management, sourcing, forecasting, cost modelling, transportation management, product life cycle management, purchase Order and sales management, invoicing, work order management, receivables, supplier collaboration management, in the enterprise application including an ERP or a supply chain management application.

Figure 2A:
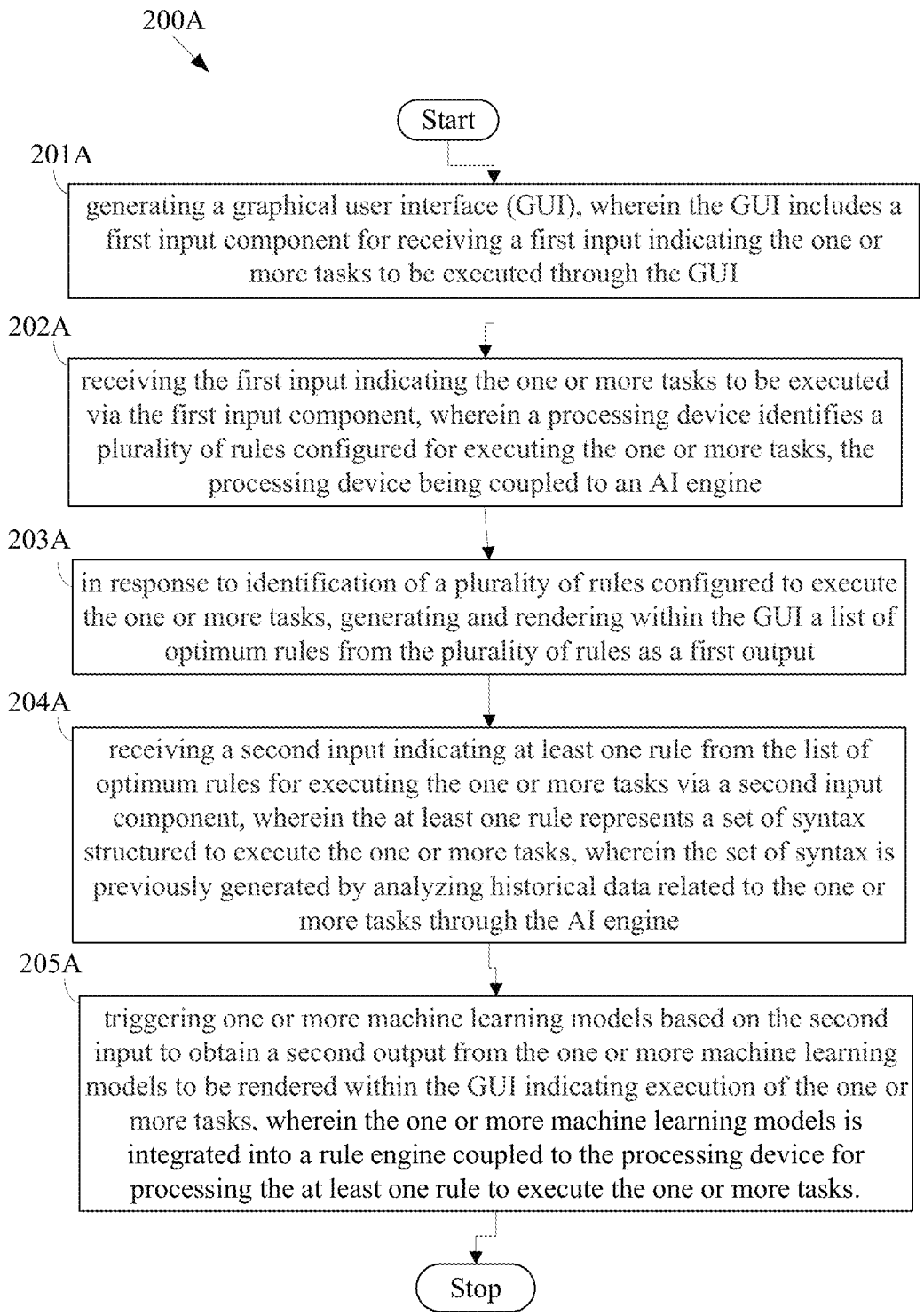
FIG. 2A is a flowchart depicting a method for executing one or more tasks through optimum rule in an enterprise application in accordance with an embodiment of the invention.

Referring to FIG. 2A, a flowchart depicting a method for executing one or more tasks through optimum rule in an enterprise application is provided in accordance with an embodiment of the invention. The method includes the step 201A of generating a graphical user interface (GUI), wherein the GUI includes a first input component for receiving a first input indicating the one or more tasks to be executed through the GUI. In step 202A, receiving the first input indicating the one or more tasks to be executed via the first input component, wherein a processing device identifies a plurality of rules configured for executing the one or more tasks, the processing device being coupled to an AI engine. In step 203A, in response to identification of a plurality of rules configured to execute the one or more tasks, generating and rendering within the GUI a list of optimum rules from the plurality of rules as a first output. In step 204A, receiving a second input indicating at least one rule from the list of optimum rules for executing the one or more tasks via a second input component, wherein the at least one rule represents a set of syntax structured to execute the one or more tasks, wherein the set of syntax is previously generated by analyzing historical data related to the one or more tasks through the AI engine. In step 205A, triggering one or more machine learning models based on the second input to obtain a second output from the one or more machine learning models to be rendered within the GUI indicating execution of the one or more tasks, wherein the one or more machine learning models is integrated into a rule engine coupled to the processing device for processing the at least one rule to execute the one or more tasks.

In an embodiment, the AI engine is configured to map the first input with a historical dataset of rules to identify the optimum rules to be rendered on the GUI for selection by the user.

In a related embodiment, the AI processing includes integration of deep learning, predictive analysis, information extraction, planning, scheduling, impact analysis and robotics for analysis of the first input data to identify the optimum rules from the plurality of rules.

In an embodiment, the input component includes a search engine configured to receive the first input, wherein the AI engine coupled to the processing device identifies intent from the received first input to generate the first output.

In an embodiment, the processing device is configured to generate a rule creation interface within the graphical user interface (GUI) in response to the received first input wherein the rule creation interface is generated if the processing device determines absence of the rules to process the one or more tasks thereby enabling the user to create the rules on the rule creation interface.

In an exemplary embodiment, the invention provides the graphical user interface (GUI) for executing one or more tasks in the dynamic data driven enterprise application. The GUI includes one or more graphical elements depicting one or more data objects, and one or more input components of the graphical elements configured for receiving one or more inputs through the interface. The one or more data objects include rule creation data object, rule evaluation data object and rule testing data object. The one or more data objects generate a projection of the one or more task within the GUI through the graphical elements. The one or more input components receive one or more input associated with the one or more data object for execution of the one or more tasks.

Figure 3:
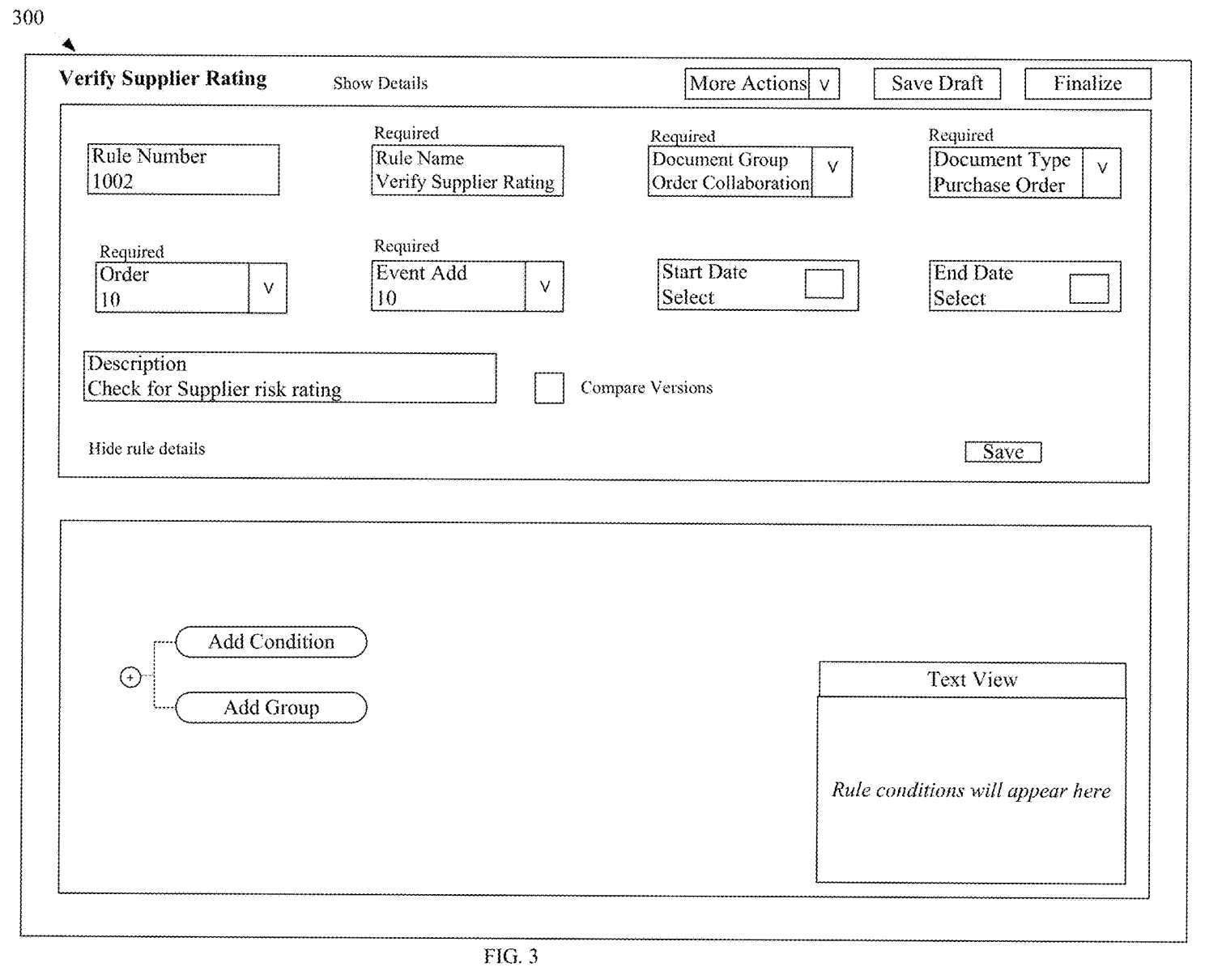

Referring to FIG. 3, a user interface 300 for rule creation is provided in accordance with an example embodiment of the invention. The user interface 300 includes rule creation by adding conditions or groups as shown. The user interface 300 enables rule creation by machine learning model driven rule engine. The user interface 300 executes rules for verification of supplier rating as a task to be executed in the enterprise application. The user interface 300 enables addition of Components in AND or OR conditions. It also handles complex conditions using a GROUP function including rule with all And Condition, Rule with And and OR condition, and rule with nested groups.

Figure 3A:
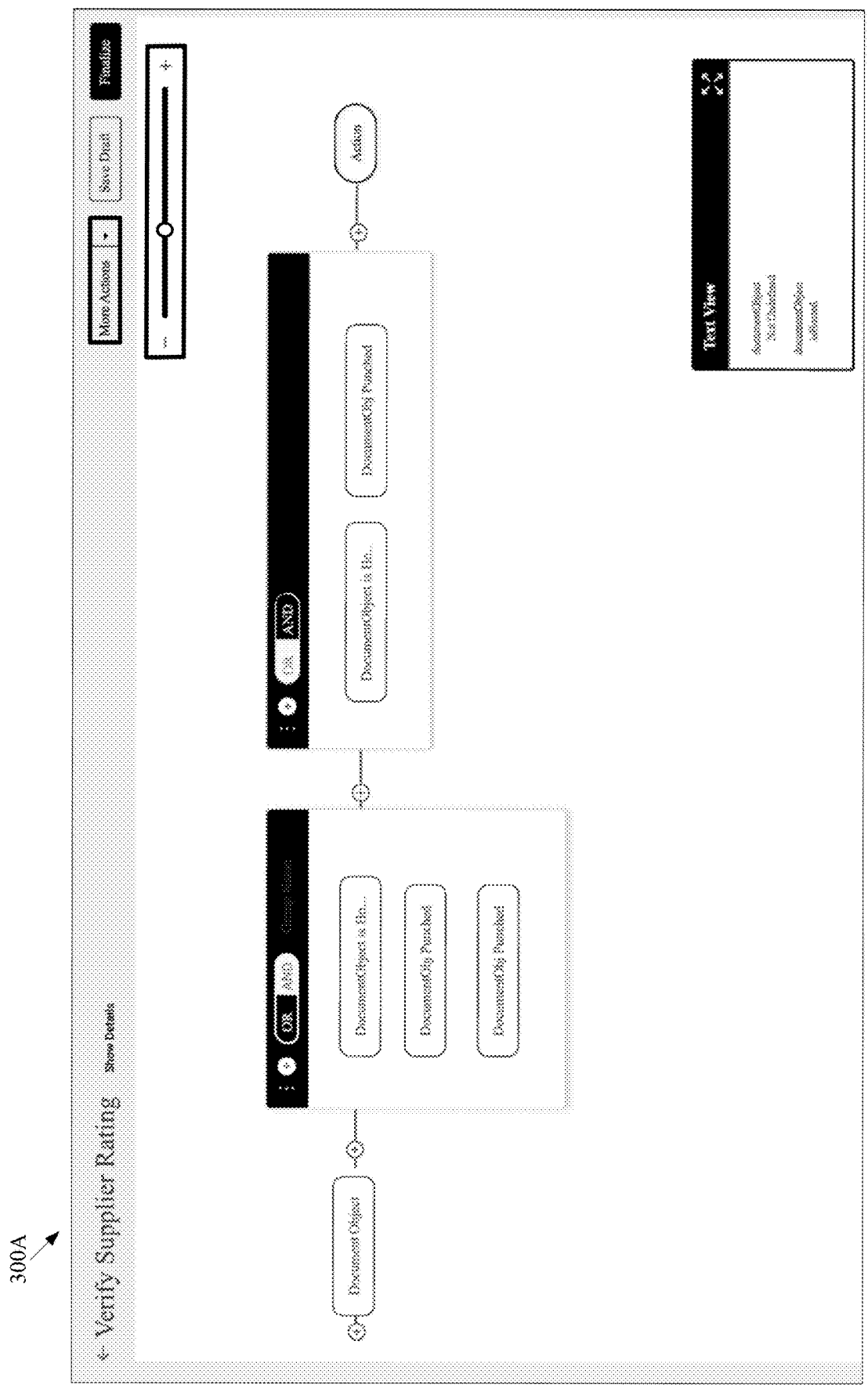
FIG. 3A is a user interface showing conversion of visual representation to code in accordance with an embodiment of the invention.

Referring to FIG. 3A, a user interface 300A showing conversion of visual representation to code for debugging is provided in accordance with an example embodiment of the invention. The user interface shows codes such as documentobject not undefined, documentobject is hosted, documentobj punched etc.

Figure 3B:
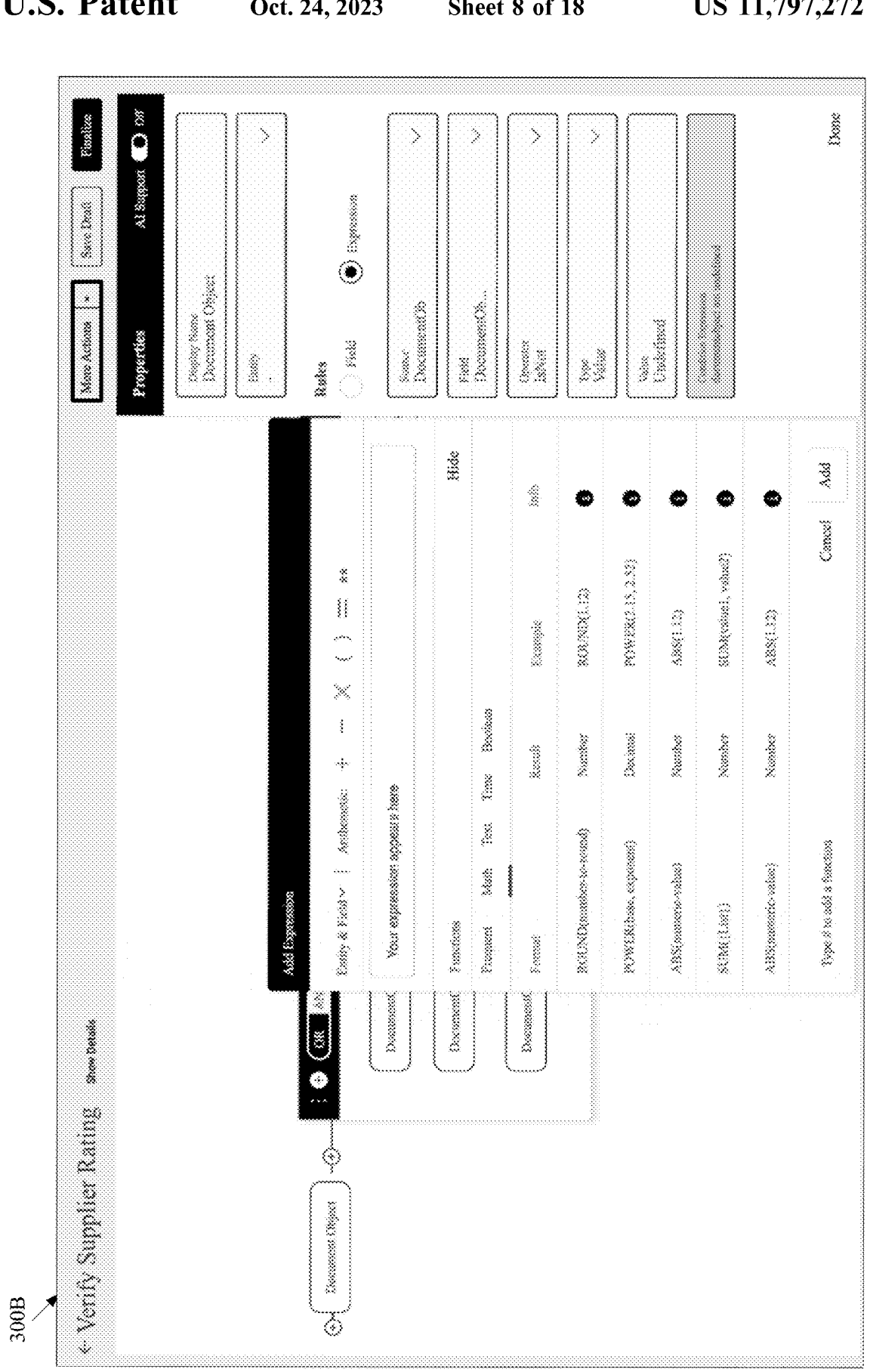
FIG. 3B is a user interface expression builder of the system in accordance with an embodiment of the invention.

Referring to FIG. 3B, a user interface (UI) expression builder 300B of the system is provided in accordance with an example embodiment of the invention. The UI Expression builder helps in writing complex functions, Boolean operations, and mathematical operators which can otherwise be done only through complex if-then-else programming by a developer.

Figure 4:
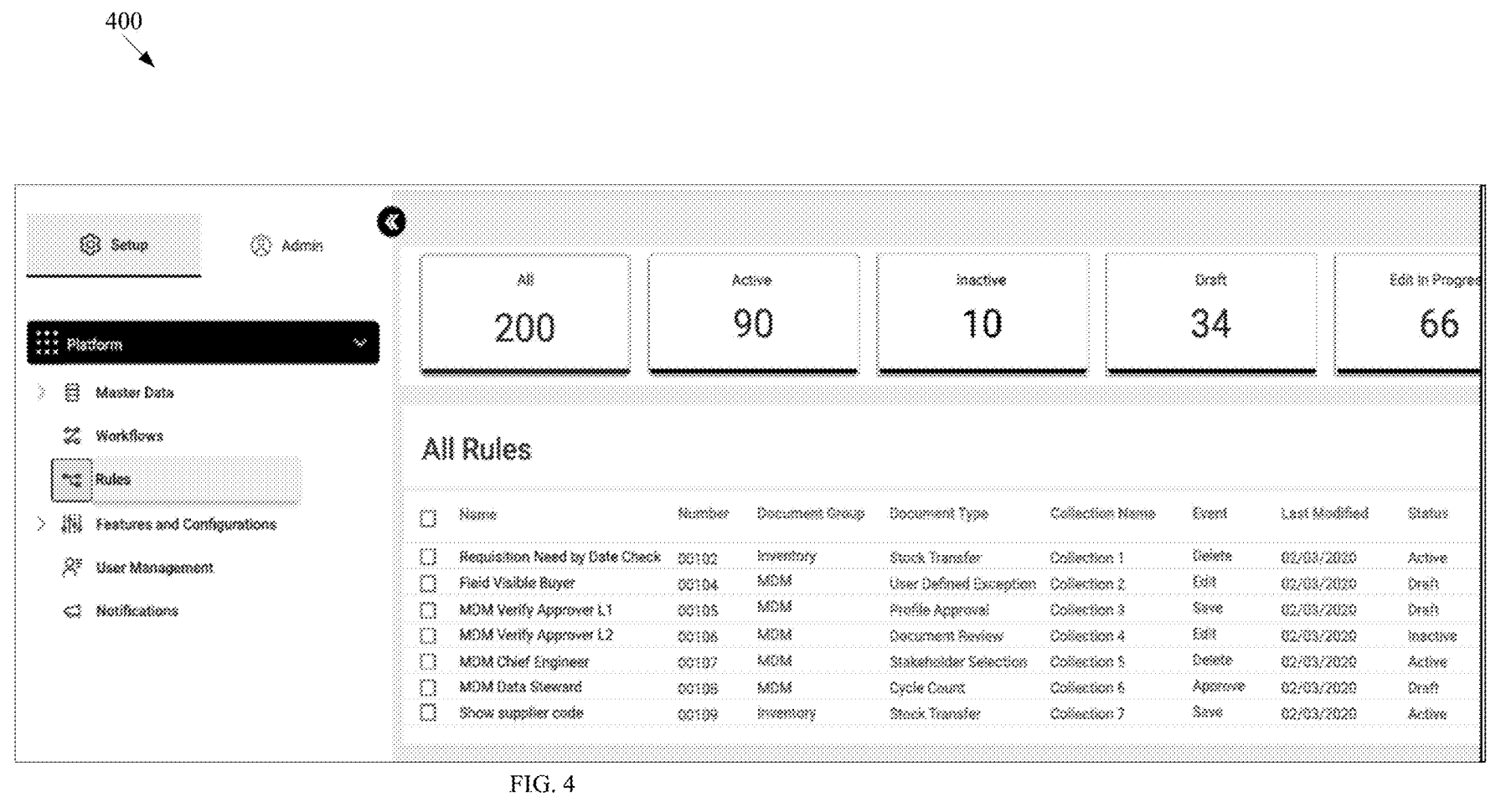
Figure 4A:
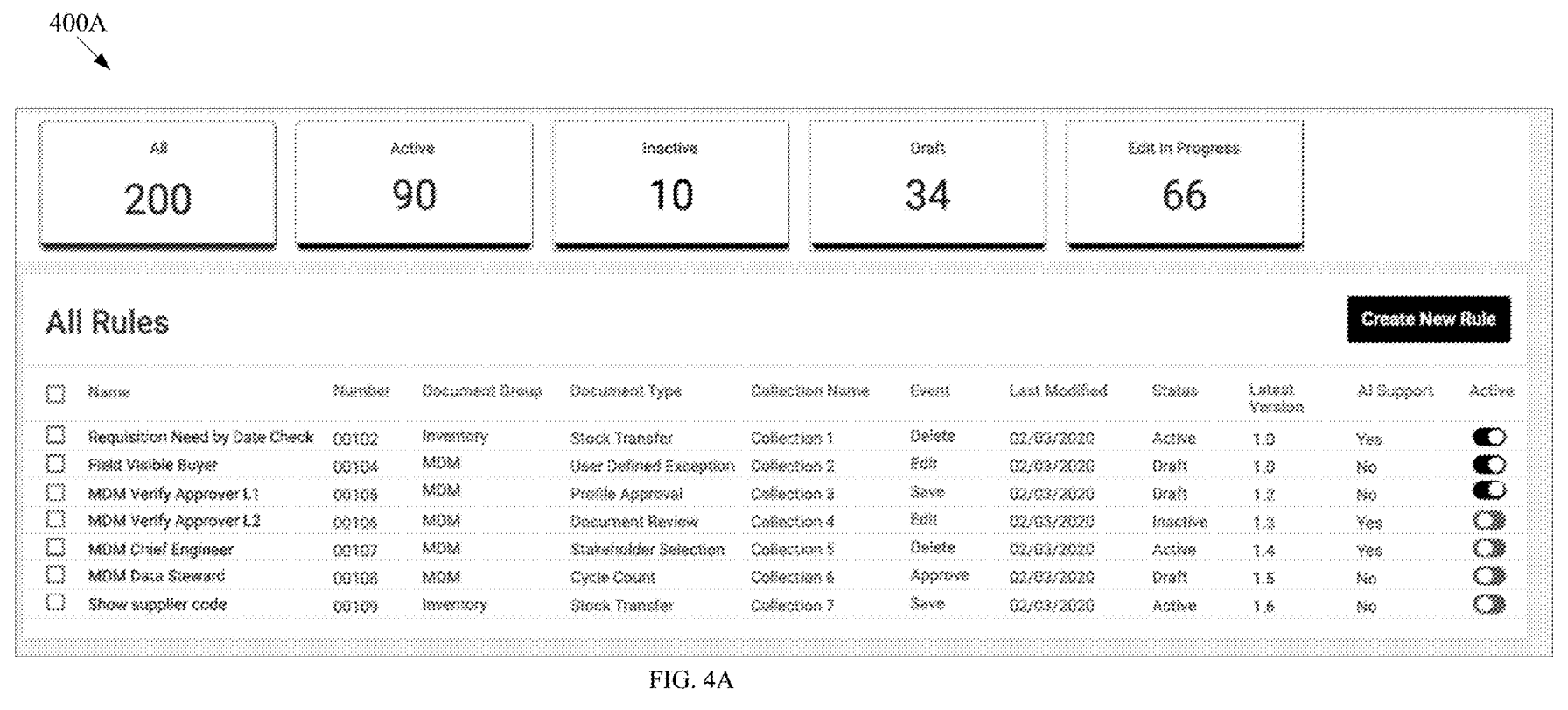

Referring to FIG. 4 and FIG. 4A, user interface (400, 400A) showing a list of rules including system configured rules, rules created on a rule creation user interface and rules created by extension tools or UI expression builder is provided in accordance with an example embodiment of the invention. The system configured rules include GDPR, ISO, security, domain, organization or system compliance rules generated based on historical dataset of the enterprise application, validation rules and AI data models.

Figure 5:
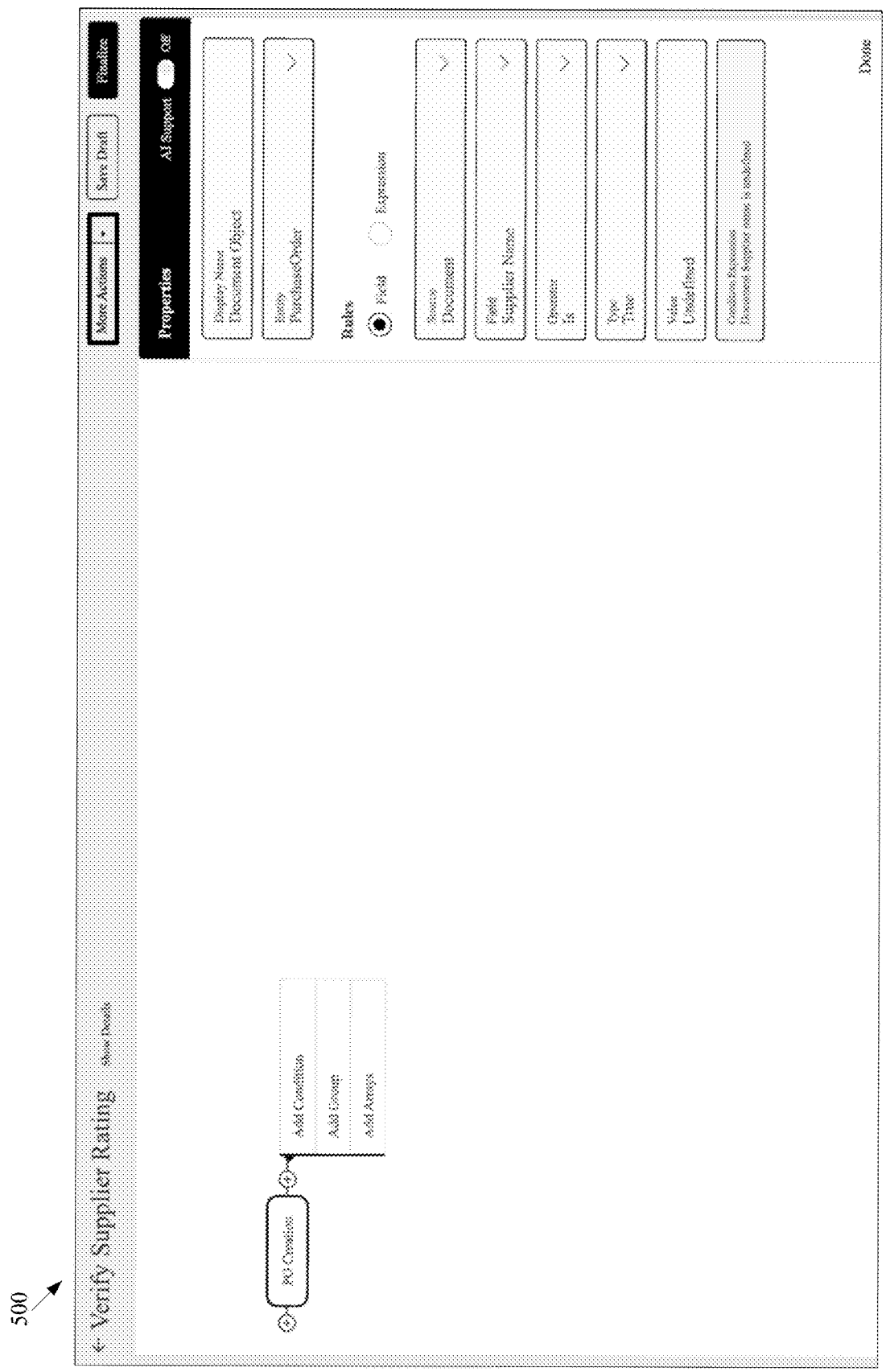
FIG. 5 is a rule creation interface for purchase order (PO) creation task in accordance with an embodiment of the invention.

Referring to FIG. 5, a rule creation interface 500 for purchase order (PO) creation task is provided in accordance with an embodiment of the invention. The interface includes addition of one or more conditions to structure the rule through one or more properties associated with rule creation.

Figure 5A:
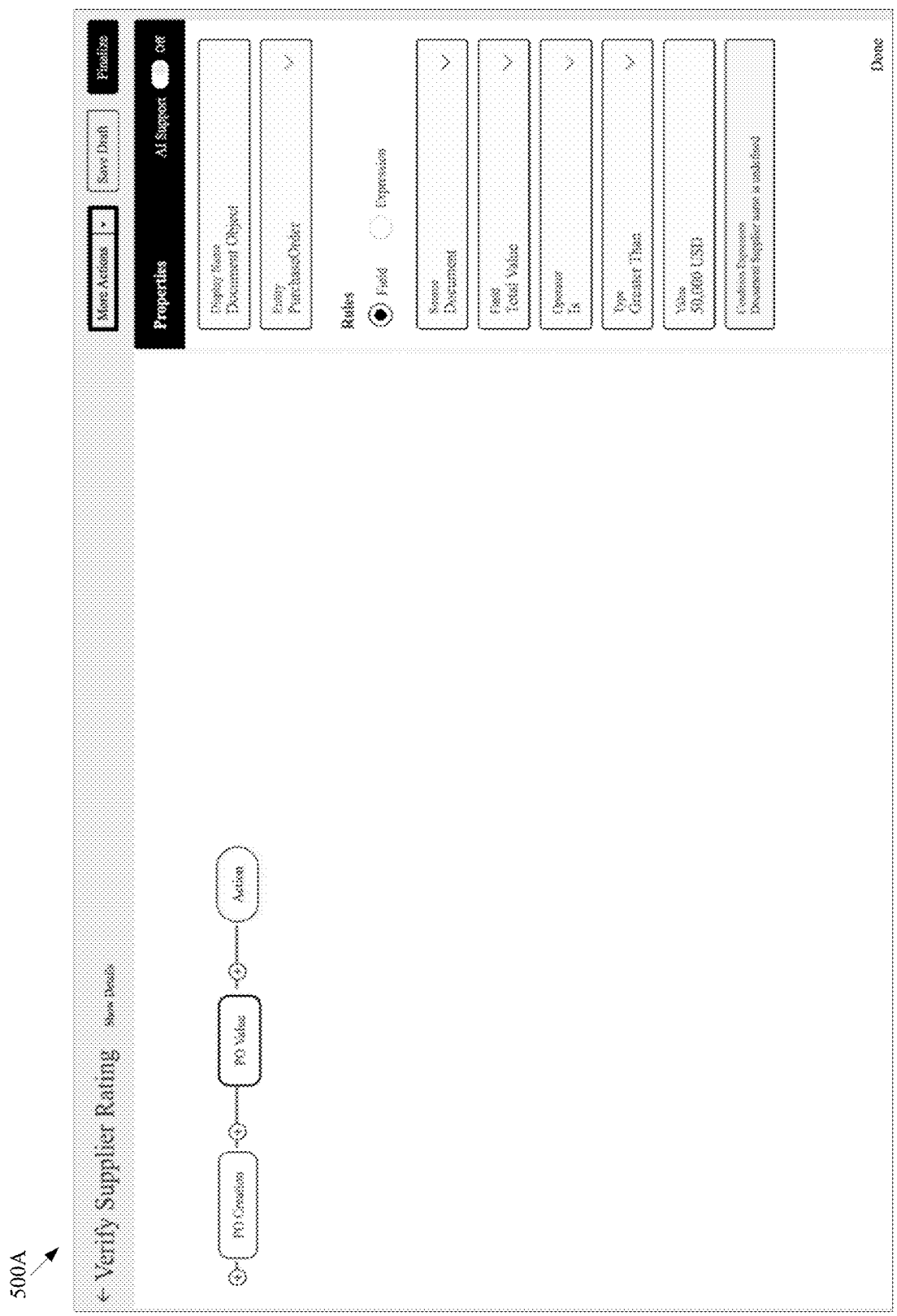
FIG. 5A is a rule creation interface associating a PO value and showing properties and rules characteristics in accordance with an embodiment of the invention.

Referring to FIG. 5A, a rule creation interface or graphical interface (GUI) 500A associating a PO value and showing properties and rules characteristics is provided in accordance with an embodiment of the invention. The rule includes processing of properties including source, operator, type, value etc., associated with field rules to execute the task.

Figure 5B:
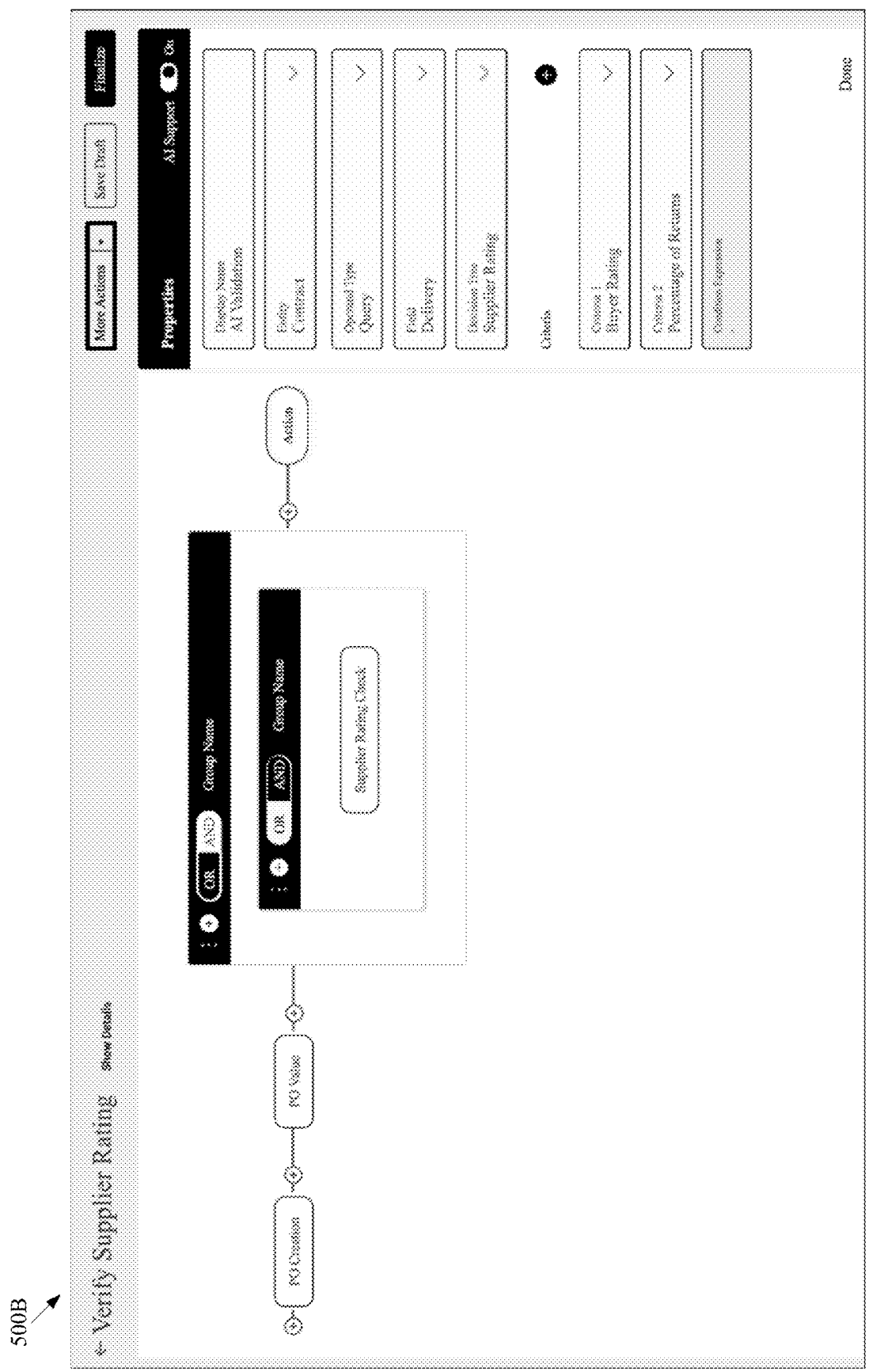
FIG. 5B is a rule creation interface showing rule for checking supplier rating with logical operators in accordance with an embodiment of the invention.

Referring to FIG. 5B, a rule creation interface or graphical interface (GUI) 500B showing rule for checking supplier rating with logical operators is provided in accordance with an embodiment of the invention. The rule includes processing of properties including one or more criteria like buyer rating, percentage of returns etc., to execute supplier rating check task.

Figure 5C:
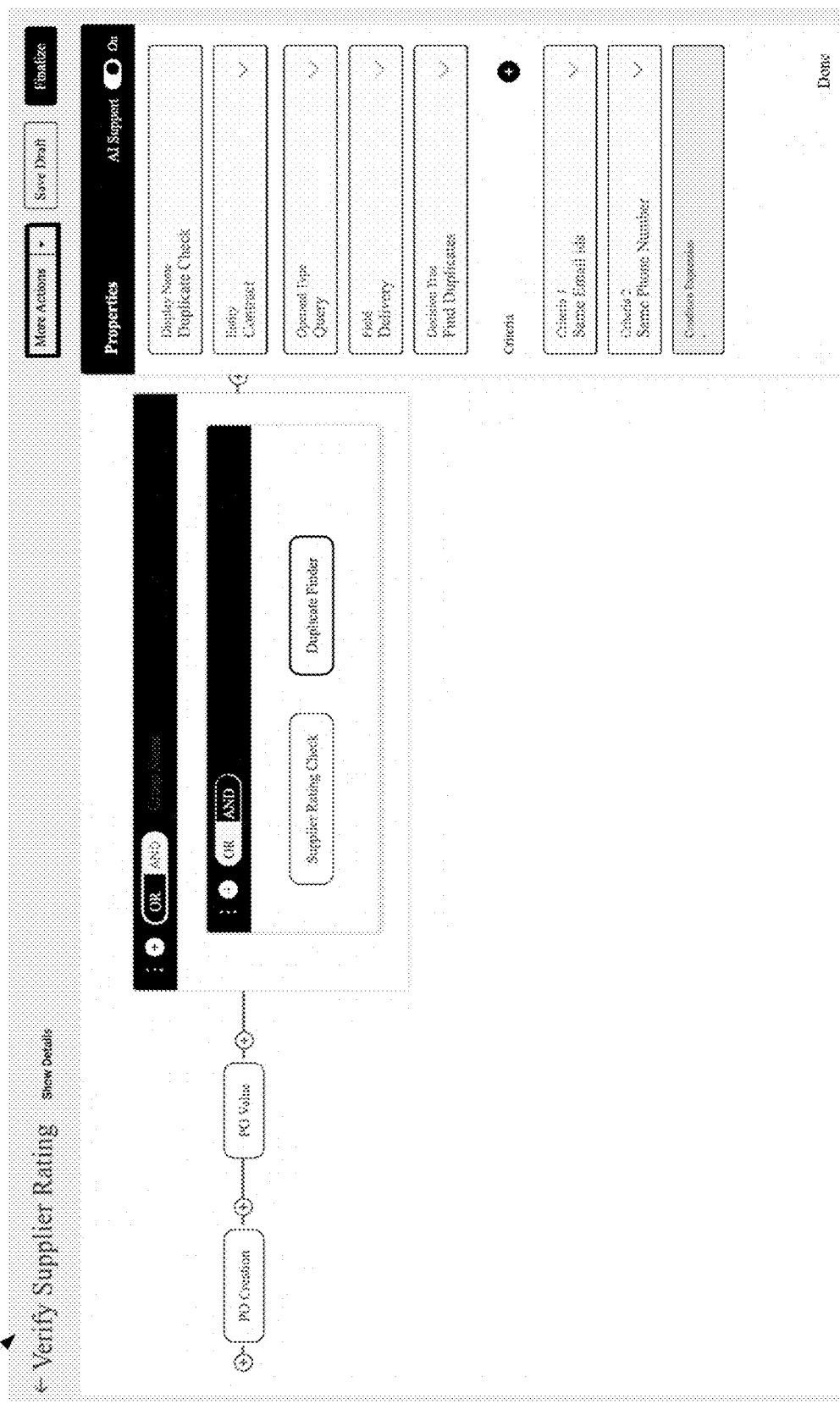
FIG. 5C is a rule creation interface creating rule for duplicate finder task in accordance with an embodiment of the invention.

Referring to FIG. 5C, a rule creation interface or graphical user interface (GUI) 500C creating rule for duplicate finder task is provided in accordance with an embodiment of the invention. The rule includes processing of properties including one or more criteria like same email Id, same phone number etc., to execute duplicate finder task.

Figure 5D:
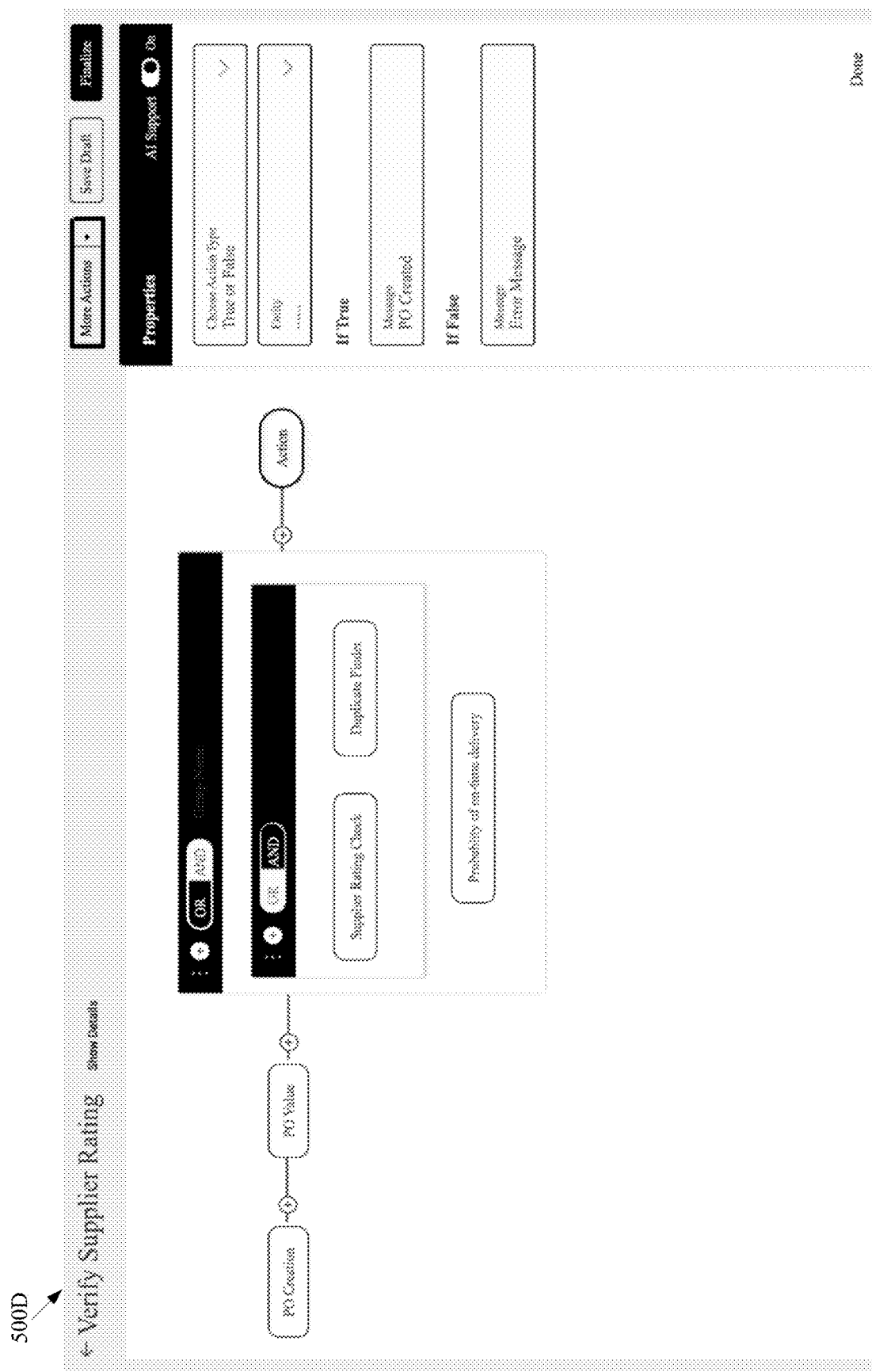
FIG. 5D is a rule creation interface creating rule for checking probability of on time delivery considering the changing parameters in accordance with an embodiment of the invention.

Referring to FIG. 5D, a rule creation interface or graphical user interface (GUI) 500D creating rule for checking probability of on time delivery considering the changing parameters is provided in accordance with an embodiment of the invention. The rule includes processing of properties with true/false conditions and support of AI engine processing the historical datasets associated with past performance of a supplier while verifying supplier risk rating as a task in the enterprise application.

Figure 5E:
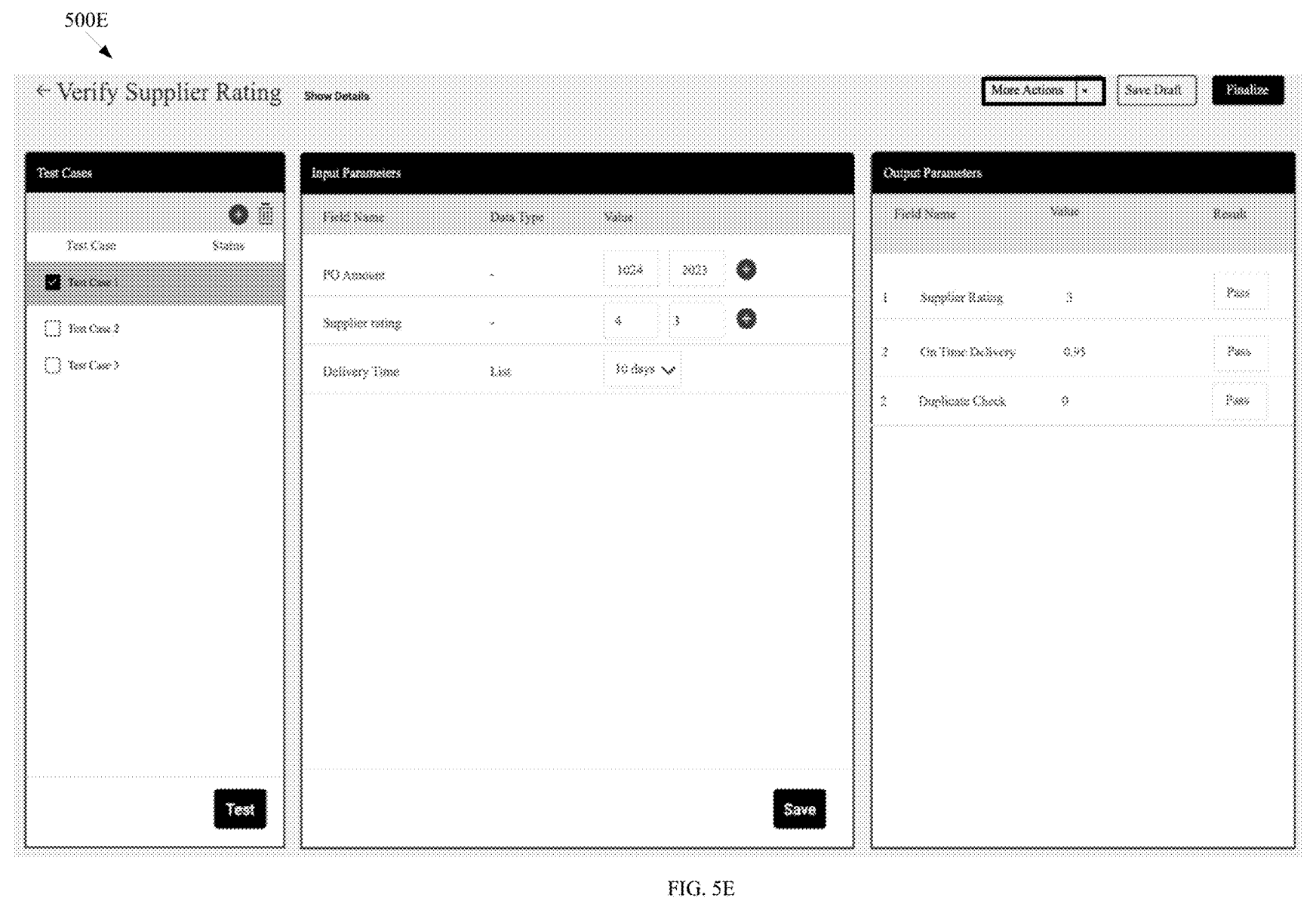

Referring to FIG. 5E, a rule creation interface 500E creating a set of test cases to run values and find the outcome from the rule to ensure that rule is working and delivering results is provided in accordance with an embodiment of the invention. The user interface enables testing and debugging of all components of rules by creating test cases and providing input values to test outcome on the GUI.

Figure 6:
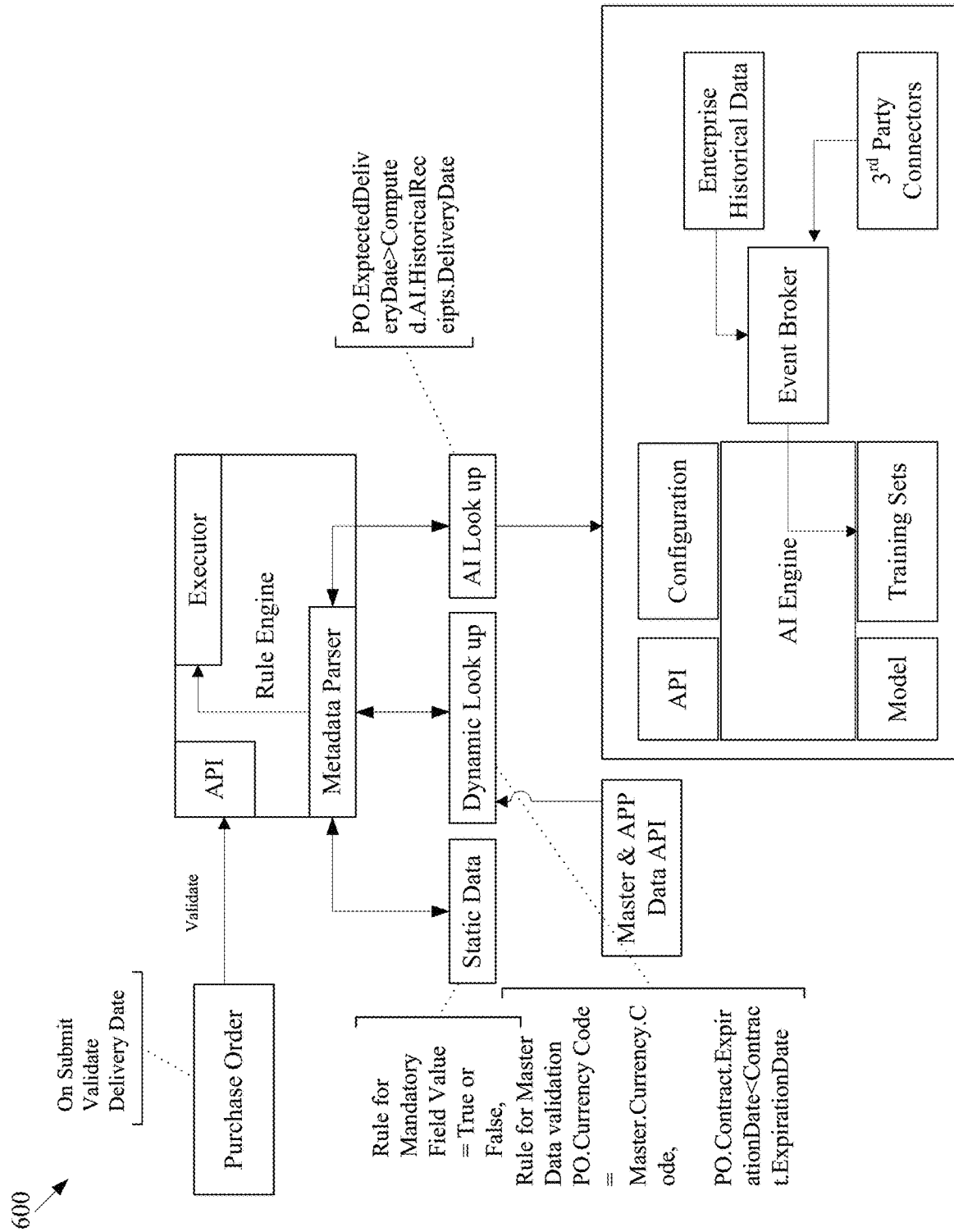
FIG. 6 is a flow diagram depicting creation of purchase order related task in accordance with an embodiment of the invention.

Referring to FIG. 6, a flow diagram 600 depicting creation of purchase order related task is provided in accordance with an example embodiment of the invention. The PO (purchase order) as a task is submitted in the enterprise application. The rule engine evaluates the basic mandatory field, approval validations, and it is determined that the expected delivery time is January 10 with a grace period of 1 week as configured. The actual delivery time is evaluated by AI engine based on historical delivery data for the same item by the supplier. The probability output of the AI is used to validate against the date entered by Purchase order (PO) author/user. The AI engine also considers external constrains/factors including but not limited to time of the year, logistic issues, weather etc. The PO submit to supplier is put on hold if the expected delivery time does not match based on the historical performance. This enables dynamic rule evaluations which was not possible with static rule conditions earlier.

Figure 7:
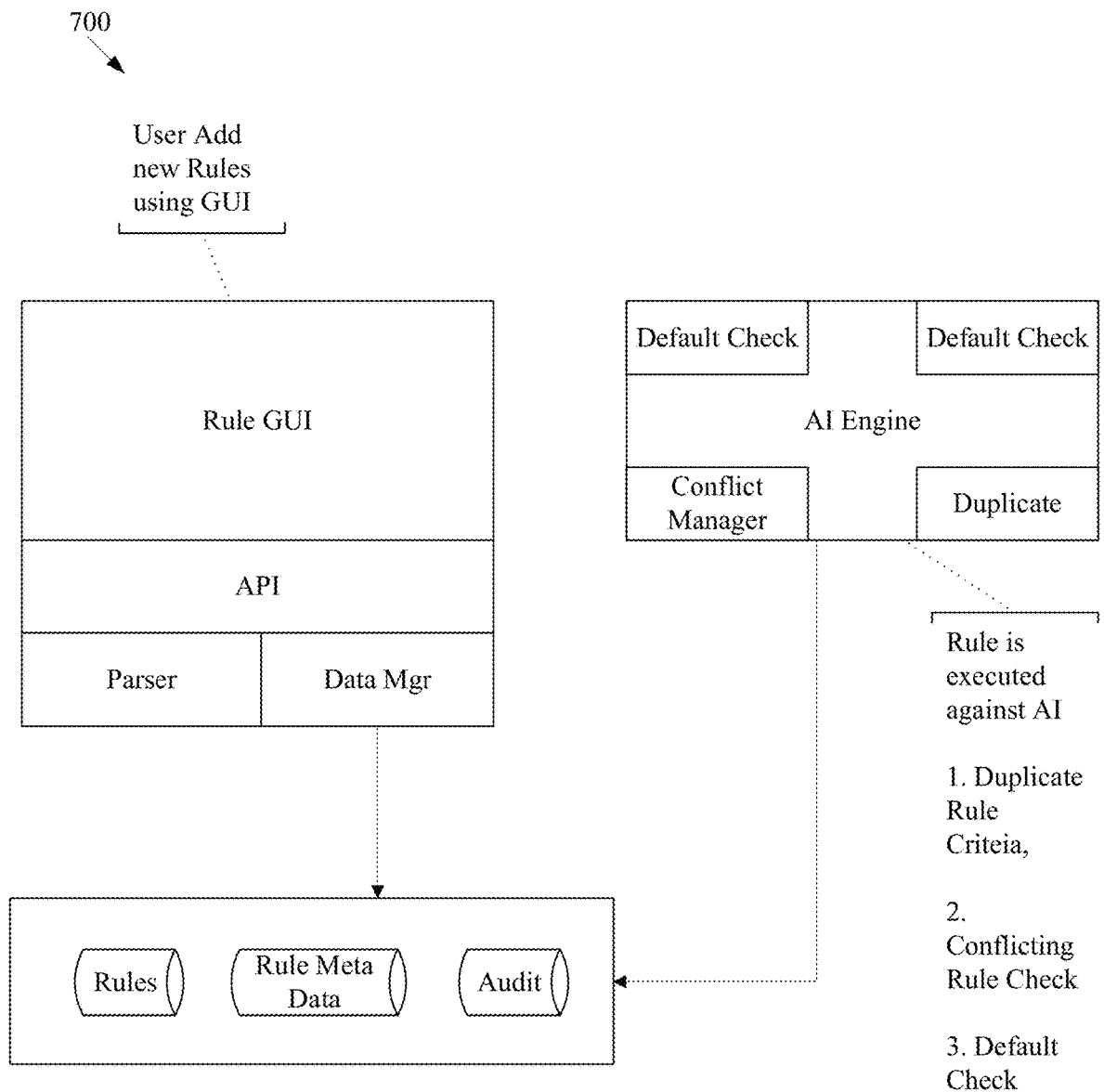
FIG. 7 is a flow diagram depicting identification of conflicting rules while executing a task in accordance with an embodiment of the invention.

Referring to FIG. 7, a flow diagram 700 depicting identification of conflicting rules while executing a task is provided in accordance with an embodiment of the invention. The graphical user interface (GUI) is configured to receive input data and render output data within the GUI to create rules, identify conflicting rules, ascertain default rules, and identify duplicate rules.

In an example scenario, rules keep grow in the EA and admin user unintentionally start creating rules having similar validations or has overlapping criterion. For e.g. a) Contract should be approved by User 1 if amount is between USD 50,000 to USD 75,000; b) Contract should be approved by User 2 if amount is between USD 80,000 to USD 100,000, etc. In case, during contract execution, the contract amount is USD 76,000 then the execution of the contract is ignored, and it will fall through without proper validations as the system will not be able to identify authorized approver. In such situations, the rule includes one or more dynamic values associated with one or more rule conditions as mentioned above. The AI engine invokes the one or more dynamic rules for processing the rule to execute the task. The AI engine is invoked while an Admin User is creating rules. It will identify duplicate of gaps in rule criterion dynamically and not with any static condition.

In an advantageous aspect, the system and method of the present invention enables extending rules engine to let users write rules that can involve machine learning based decisions as rules refer to ML derived decisions. The invention injects data driven aspect into rules through Machine learning models. Further, the invention standardizes integration of any ML model into a rule engine and other framework(s). Furthermore, it Wraps ML models into specific patterns for rule-engine integration.

In another advantageous aspect, the rules Engine provides unique benefits to end-users focusing on codeless platform. The system and method of the invention provides a graphical user interface with simple interaction to non-technical users to build Rules. The invention provides a visual and easy to interpret representation of rules. It automatically generates the code version in the background, while assisting user to validate and test it through simple actions on screen. The system further provides support for AI/ML engines as priority feature within rule creation interface to handle complex use cases. The system defines multiple complex conditions and actions through Artificial Intelligence/self-learning algorithms and build complicated rules using machine learning to automate workflows.

In an exemplary embodiment, the application user interface (UI) and the rule creation user interface of the entity machines enables cognitive computing to improve interaction between user and an enterprise or supply chain application(s). The interface improves the ability of a user to use the computer machine itself. Since, the interface triggers configurable components of the platform architecture along with components of the rule creation user interface for executing one or more tasks including but not limited to creation of Purchase order, Contract lifecycle management operations, Warehouse management operations, inventory management operations etc., at the same instant, the interface thereby enables a user to take informed decision or undertake an appropriate strategy for adjusting workflow for execution of operations. By structuring operations and application functions through a layered platform architecture and eliminating multiple cross function layers, repetitive processing tasks and recordation of information to get a desired data or operational functionality, which would be slow and complex, the user interface is more user friendly and improves the functioning of the existing computer systems.

The present invention uses Artificial intelligence, process orchestration and layered platform architecture where the entire operational logic in the service is transformed into engine reducing complex logic at the back end. The sequence flow is translated in the engine through GUI. It is very helpful to manage multitenant applications. The system includes both backend and frontend components (UI components, rules engine and workflow) being restructured. The system offers productivity gain and accelerates implementation cycle. The system empowers functional admin to configure UI, add fields, layouts, rule engine and workflows without development efforts. The single page application framework provides better user experience, ability to configure localization and theming from admin portal without engineering support.

In an exemplary embodiment, the present invention may be a platform architecture, application framework, system, a method, and/or a computer program product. The computer program product may include a computer readable storage medium (or media) having computer readable program instructions thereon for causing a processor to carry out aspects of the present invention. The media has embodied therein, for instance, computer readable program code (instructions) to provide and facilitate the capabilities of the present disclosure. The article of manufacture (computer program product) can be included as a part of a computer system/computing device or as a separate product.

The computer readable storage medium can retain and store instructions for use by an instruction execution device i.e. it can be a tangible device. The computer readable storage medium may be, for example, but is not limited to, an electromagnetic storage device, an electronic storage device, an optical storage device, a semiconductor storage device, a magnetic storage device, or any suitable combination of the foregoing. A non-exhaustive list of more specific examples of the computer readable storage medium includes the following: a hard disk, a random access memory (RAM), a portable computer diskette, a read-only memory (ROM), a portable compact disc read-only memory (CD-ROM), an erasable programmable read-only memory (EPROM or Flash memory), a digital versatile disk (DVD), a static random access memory (SRAM), a floppy disk, a memory stick, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the internet, a local area network (LAN), a wide area network (WAN) and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The invention claimed is:

1. A method for executing one or more tasks in an enterprise application, the method comprising:
   generating a graphical user interface (GUI), wherein the GUI includes a first input component for receiving a first input indicating the one or more tasks to be executed through the GUI;
   receiving the first input indicating the one or more tasks to be executed via the first input component, wherein a processing device identifies a plurality of rules configured for executing the one or more tasks, the processing device being coupled to an Artificial Intelligence (AI) engine;
   in response to identification of a plurality of rules configured to execute the one or more tasks, generating and rendering within the GUI a list of optimum rules from the plurality of rules as a first output,
   receiving a second input indicating at least one rule from the list of optimum rules for executing the one or more tasks via a second input component, wherein the at least one rule represents a set of syntax structured to execute the one or more tasks, wherein the set of syntax is previously generated by analyzing historical data related to the one or more tasks through the AI engine; and
   triggering one or more machine learning models based on the second input to obtain a second output from the one or more machine learning models to be rendered within the GUI indicating execution of the one or more tasks, wherein the one or more machine learning models is integrated into a rule engine coupled to the processing device for processing the at least one rule to execute the one or more tasks.

2. The method of claim 1, wherein the one or more machine learning models include classification model, regression model, recommendation model and clustering/anomaly detection model.

3. The method of claim 2, wherein the one or more machine learning models create a standardized integration with each type of the one or more machine learning models in the rule engine.

4. The method of claim 3, wherein the one or more machine learning models are trained and deployed as model-as-service thereby enabling access to the models as microservice of a codeless platform.

5. The method of claim 4, further comprising:
   one or more data scripts configured for generating the list of optimum rules based on a rule evaluation, wherein the one or more data scripts are backend scripts created by a bot based on the first input and AI processing for enabling automation of identifying and generating the optimum rules from the plurality of rules.

6. The method of claim 5, wherein the AI engine is configured to map the first input with a historical dataset of rules to identify the optimum rules to be rendered on the GUI for selection by the user wherein the AI processing includes integration of deep learning, predictive analysis, information extraction, planning, scheduling, impact analysis and robotics for analysis of the first input data to identify the optimum rules from the plurality of rules.

7. The method of claim 6, wherein the input component includes a search engine configured to receive the first input, wherein the AI engine coupled to the processing device identifies intent from the received first input to generate the first output.

8. The method of claim 7, wherein the processing device is configured to generate a rule creation interface within the graphical user interface (GUI) in response to the received first input wherein the rule creation interface is generated if the processing device determines absence of the rules to process the one or more tasks thereby enabling the user to create the rules on the rule creation interface.

9. The method of claim 8, further comprises:
   receiving at least one rule on the rule creation interface by a user to execute the one or more tasks wherein a rule creation syntax data library is provided on the interface for enabling the user to create the at least one rule; and
   identifying and triggering one or more machine learning (ML) models related to the at least one rule for processing the at least one rule to execute the one or more tasks.

10. The method of claim 9, wherein the at least one rule includes system configured rules created by an enterprise application codeless platform, rules created by extension tools, and rules created on the rules creation interface.

11. The method of claim 10, wherein the system configured rules include GDPR, ISO, security, domain, organization or system compliance rules generated based on historical dataset of the enterprise application, validation rules and AI data models.

12. The method of claim 11, wherein the GUI is configured to receive input data and render output data within the GUI to create rules, identify conflicting rules, ascertain default rules, identify duplicate rules, test and debug all components of rules by creating test cases and providing input values to test outcome on the GUI.

13. The method of claim 12, wherein the rule creation syntax data library includes one or more components related to a plurality of enterprise application functions, wherein the components include condition, group, array, properties, criteria, logical operators, functional or operational components.

14. The method of claim 13, wherein the one or more tasks include demand planning, supply planning, inventory management, warehouse management, contract lifecycle management, sourcing, forecasting, cost modelling, transportation management, product life cycle management, Purchase Order and sales management, invoicing, work order management, receivables, supplier collaboration management, in the enterprise application including an ERP or a supply chain management application.

15. The method of claim 14, wherein the at least one rule includes one or more dynamic values associated with one or more rule conditions wherein the one or more dynamic values is invoked by the AI engine for processing the rule to execute the one or more task.

16. A system for executing one or more tasks in an enterprise application, the system comprising:
   a processing device; and
   a memory device including instructions that are executable by the processing device for causing the processing device to:
   generate a GUI, wherein the GUI includes a first input component for receiving a first input indicating the one or more tasks to be executed through the GUI;
   receive the first input indicating the one or more tasks to be executed via the first input component, wherein an AI engine coupled to the processing device identifies a plurality of rules configured for executing the one or more tasks;
   in response to identification of a plurality of rules configured to execute the one or more tasks, generate and render within the GUI, a list of optimum rules from the plurality of rules;
   receive a second input indicating at least one rule from the optimum rules for executing the one or more tasks via a second input component, wherein the at least one rule represents a set of syntax structured to execute the one or more tasks, wherein the set of syntax is previously generated by analyzing historical data related to the one or more tasks through the AI engine; and
   trigger one or more machine learning models based on the second input to obtain a second output from the one or more machine learning models to be rendered within the GUI indicating execution of the one or more task, wherein the one or more machine learning models are integrated into a rule engine coupled to the processing device for processing the at least one rule to execute the one or more tasks.

17. The system of claim 16, wherein the processing device is configured to:
   receive at least one rule on the rule creation interface by a user to execute the one or more tasks wherein a rule creation syntax data library is provided on the interface for enabling the user to create the at least one rule; and
   identifying and triggering one or more machine learning (ML) models related to the at least one rule for processing the at least one rule to execute the one or more tasks.

18. The system of claim 17, wherein the rule creation interface is a graphical user interface (GUI) that includes:
   one or more graphical elements depicting one or more data objects including a rule creation data object, a rule evaluation data object and a rule testing data object wherein the one or more data objects generate at least one rule within the GUI through the graphical elements; and
   one or more input components of the graphical elements configured for receiving one or more inputs associated with the one or more data object for execution of the one or more tasks.

19. The system of claim 18, further comprises a blockchain network enabling processing of a federated machine learning model wherein the federated machine learning model is configured to combine/federate output of one or more distinct machine learning models.

20. A non-transitory computer program product for executing one or more tasks in an enterprise application, the computer program product comprising a non-transitory computer readable storage medium having instructions embodied therewith, the instructions when executed by one or more processors causes the one or more processors to:
   generate a GUI, wherein the GUI includes a first input component for receiving a first input indicating the one or more tasks to be executed through the GUI;
   receive the first input indicating the one or more tasks to be executed via the first input component, wherein an AI engine coupled to the processing device identifies a plurality of rules configured for executing the one or more tasks;
   in response to identification of a plurality of rules configured to execute the one or more tasks, generate and render within the GUI, a list of optimum rules from the plurality of rules;
   receive a second input indicating at least one rule from the optimum rules for executing the one or more tasks via a second input component, wherein the at least one rule represents a set of syntax structured to execute the one or more tasks, wherein the set of syntax is previously generated by analyzing historical data related to the one or more tasks through the AI engine; and
   trigger one or more machine learning models based on the second input to obtain a second output from the one or more machine learning models to be rendered within the GUI indicating execution of the one or more task, wherein the one or more machine learning models are integrated into a rule engine coupled to the processing device for processing the at least one rule to execute the one or more tasks.

* * * * *